(12) United States Patent
Nakai et al.

(10) Patent No.: US 6,570,874 B1
(45) Date of Patent: May 27, 2003

(54) ATM SWITCH

(75) Inventors: Kohei Nakai, Tokyo (JP); Naoaki Yamanaka, Tokyo (JP); Eiji Oki, Tokyo (JP)

(73) Assignee: Nippon Telegraph & Telephone Corporation, Tokyo (JP)

( * ) Notice: Subject to any disclaimer, the term of this patent is extended or adjusted under 35 U.S.C. 154(b) by 0 days.

(21) Appl. No.: 09/261,652

(22) Filed: Mar. 3, 1999

(30) Foreign Application Priority Data

| Mar. 5, 1998 | (JP) | 10-053815 |
| Jul. 15, 1998 | (JP) | 10-200780 |
| Jan. 27, 1999 | (JP) | 11-018777 |

(51) Int. Cl.[7] .................. H04Q 11/00; H04J 14/08; H04L 12/56
(52) U.S. Cl. ............... 370/387; 370/395.1; 359/117; 359/128; 359/139
(58) Field of Search ................ 370/386, 388, 370/387, 466, 467, 395.1, 465; 359/113, 115, 117, 123, 124, 128, 139

(56) References Cited

U.S. PATENT DOCUMENTS 5,600,469 A * 2/1997 Yamazaki .............. 359/123

FOREIGN PATENT DOCUMENTS

| JP | 7-87097 | 9/1993 |
| JP | 7-79238 | 7/1994 |
| JP | 10-13867 | 6/1996 |

OTHER PUBLICATIONS

Yasukawa et al. "640 Gb/s Ultra–High–Speed Interconnection System Using Wide–Channel Spacing Wavelength Division Multiplexing" IEEE BSS '97, pp. 101–105, Dec. 1997.*

N. Yamanaka, S.Yasukawa, E.Oki and T.Kawamura, "Optima: Tb/s ATM Switching System Architecture: Based on Highly Statistical Optical WDM Interconnection," Proc. IEEE ISS'97, System Architecure, 1997.

S.Yasukawa, N.Yamanaka, "640Gb/s Ultra–High–Speed Optical Interconnection System Using Wide–Channel– Spacing Wavelength Division Multiplexing," Proc.IEEE BSS'97, pp. 101–105, Dec. 1997.

"Standard ATM Textbook", ASCII, p. 47, Mar. 1, 1995 (concise English explanation).

Yasukawa et al., "A Study of WDM Interconnection Technology In Switch System", Proceedings of the 1997 IEICE General Conference, Mar. 1997 (concise English explanation).

* cited by examiner

Primary Examiner—Hassan Kizou
Assistant Examiner—Afsar M. Qureshi
(74) Attorney, Agent, or Firm—Kenyon & Kenyon

(57) ABSTRACT

An ATM switch includes a plurality of stages in which each stage has basic switches and the stages are interconnected. The ATM switch includes M×N basic switches per each stage and a part for interconnecting between the stages. The M×N basic switches are divided into N groups. The part connects an output port of each basic switch at a front stage to M input ports of the basic switches at a back stage. At the output port, a wavelength-multiplexing part is used, and, at the input port, a wavelength-demultiplexing part is used. Further, a wavelength-switching part for switching optical signals of M wavelength-multiplexed optical signals arriving from the M wavelength-multiplexing part and outputting the switched wavelength-multiplexed optical signals to the M wavelength-demultiplexing part is used.

22 Claims, 23 Drawing Sheets

FIG. 2

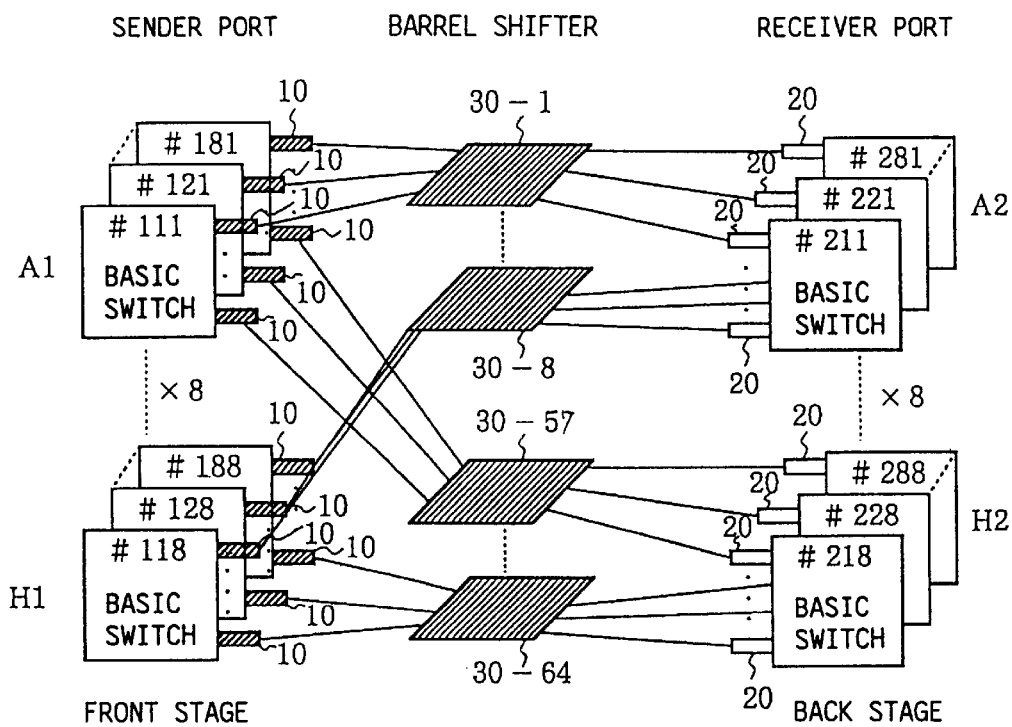

FIG. 3

| | | OUTPUT WAVEGUIDE | | | | | | | |
|---|---|---|---|---|---|---|---|---|---|
| | | # 21j | # 22j | # 23j | # 24j | # 25j | # 26j | # 27j | # 28j |
| INPUT WAVEGUIDE | # 11i | $\lambda_1$ | $\lambda_2$ | $\lambda_3$ | $\lambda_4$ | $\lambda_5$ | $\lambda_6$ | $\lambda_7$ | $\lambda_8$ |
| | # 12i | $\lambda_8$ | $\lambda_1$ | $\lambda_2$ | $\lambda_3$ | $\lambda_4$ | $\lambda_5$ | $\lambda_6$ | $\lambda_7$ |
| | # 13i | $\lambda_7$ | $\lambda_8$ | $\lambda_1$ | $\lambda_2$ | $\lambda_3$ | $\lambda_4$ | $\lambda_5$ | $\lambda_6$ |
| | # 14i | $\lambda_6$ | $\lambda_7$ | $\lambda_8$ | $\lambda_1$ | $\lambda_2$ | $\lambda_3$ | $\lambda_4$ | $\lambda_5$ |
| | # 15i | $\lambda_5$ | $\lambda_6$ | $\lambda_7$ | $\lambda_8$ | $\lambda_1$ | $\lambda_2$ | $\lambda_3$ | $\lambda_4$ |
| | # 16i | $\lambda_4$ | $\lambda_5$ | $\lambda_6$ | $\lambda_7$ | $\lambda_8$ | $\lambda_1$ | $\lambda_2$ | $\lambda_3$ |
| | # 17i | $\lambda_3$ | $\lambda_4$ | $\lambda_5$ | $\lambda_6$ | $\lambda_7$ | $\lambda_8$ | $\lambda_1$ | $\lambda_2$ |
| | # 18i | $\lambda_2$ | $\lambda_3$ | $\lambda_4$ | $\lambda_5$ | $\lambda_6$ | $\lambda_7$ | $\lambda_8$ | $\lambda_1$ |

FIG.15
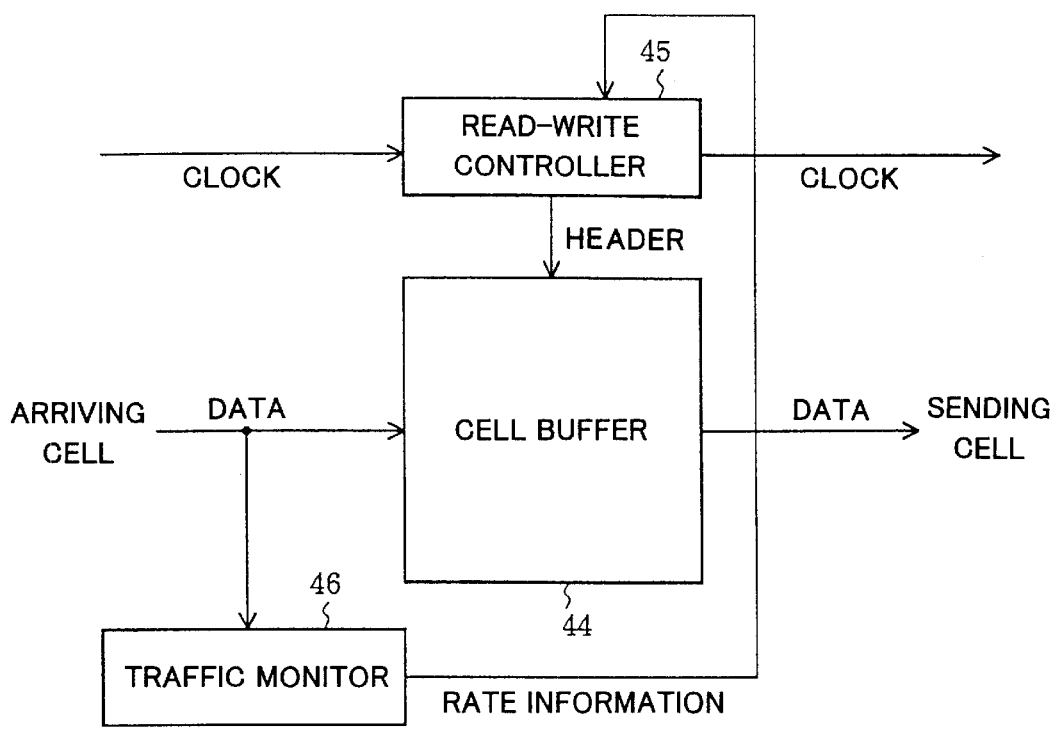
FIG.16
ARRIVING CELLS
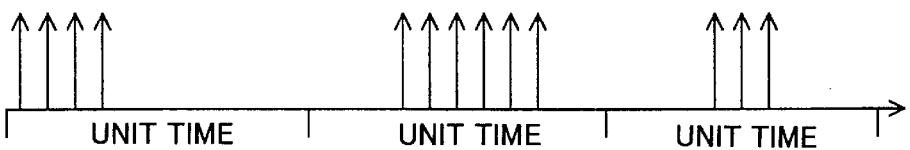
SENDING CELLS
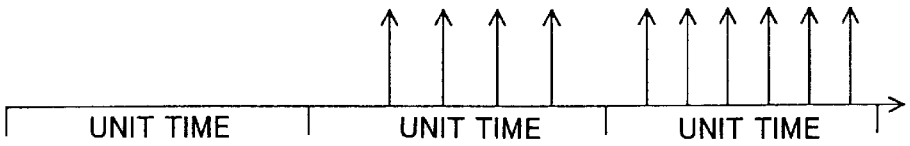

ARRAYED WAVEGUIDE GRATING
(AWG)

FIG.32

| I/O | O1 | O2 | O3 | O4 | O5 |
|-----|----|----|----|----|----|
| i1 | $\lambda_0$ | $\lambda_1$ | $\lambda_2$ | $\lambda_3$ | $\lambda_4$ |
| i2 | $\lambda_4$ | $\lambda_0$ | $\lambda_1$ | $\lambda_2$ | $\lambda_3$ |
| i3 | $\lambda_3$ | $\lambda_4$ | $\lambda_0$ | $\lambda_1$ | $\lambda_2$ |
| i4 | $\lambda_2$ | $\lambda_3$ | $\lambda_4$ | $\lambda_0$ | $\lambda_1$ |
| i5 | $\lambda_1$ | $\lambda_2$ | $\lambda_3$ | $\lambda_4$ | $\lambda_0$ |

ATM SWITCH

BACKGROUND OF THE INVENTION

1. Field of the Invention

The present invention generally relates to an ATM switch, and, more particularly, to technologies in which a plurality of ATM switches are interconnected to realize a large-scale ATM switch.

2. Description of the Related Art

It is common to configure a large-scale ATM switch by interconnecting basic switches. FIG. 28 is a block diagram of an ATM switch in which basic switches are interconnected.

Conventionally, as shown in FIG. 28, output ports of basic switches #11–#1N at a front stage are connected to input ports of basic switches #21–#2N at a back stage in a mesh manner. In other words, the number of the output ports of the basic switches #11–#1N is the same as the number of the input ports of the basic switches #21–#2N, such that the output ports are in a one-to-one correspondence with the input ports, and each of the basic switches #11–#1N selects an output port for a cell which is entered into one of the basic switches #11–#1N so that a basic switch among the basic switches #21–#2N is decided for the cell to be sent out to.

For example, in the case of using basic switches of 8 inputs by 8 outputs (8×8), an ATM switch of 64 inputs by 64 outputs as a whole can be realized by interconnecting 8 basic switches #11–#18 in the first stage and 8 basic switches #21–#28 in the back stage.

Regarding the switch interconnection, a technology using a barrel shifter and a wavelength-multiplexing-optical-fiber is illustrated in N. Yamanaka, S. Yasukawa, E. Oki and T. Kawamura, "OPTIMA:Tb/s ATM Switching System Architecture: Based on Highly Statistical Optical WDM Interconnection," Proc. IEEE ISS'97, System Architecture, 1997 and S. Yasukawa, N. Yamanaka, "640 Gb/s Ultra-High-Speed Optical interconnection System using Wide-Channel-Spacing Wavelength Division Multiplexing," Proc.IEEE BSS'97, p.p.101–105, December 1997.

FIG. 29 is a block diagram showing an ATM switch in which basic switches are interconnected in a multistage manner. In the ATM switch, the basic switches are interconnected via WDM (wavelength division multiplexing) links by using a barrel shifter which switches signals in the WDM links according to wavelength, and, in the basic switches of the front stage, destinations of signals are determined by selecting wavelengths by which the signals are sent. Each basic switch in the back stage is connected to every basic switch in the front stage by logical links of different wavelengths. According to the above-mentioned configuration, a number of physical links between the basic switches can be eliminated.

In the following, the barrel shifter will be described with reference to FIG. 30. FIG. 30 shows how optical signals are switched within the barrel shifter. FIG. 30 shows an example in which the barrel shifter has 2 input lines I0, I1 and 4 output lines O0–O3. Here, optical signals of wavelengths $\lambda_0$–$\lambda_3$ are transmitted on each of the input lines I0, I1, and optical signals of wavelengths $\lambda_0$, $\lambda_1$, $\lambda_2$, $\lambda_3$ on the input lines I0 are respectively sent to the output lines O0, O1, O2, O3. Further, optical signals of wavelengths $\lambda_0$, $\lambda_1$, $\lambda_2$, $\lambda_3$ on the input line I1 are respectively sent to the output lines O1, O2, O3, O0. Therefore, for example, a wavelength which goes to the output line O1 is $\lambda_1$ among the wavelengths $\lambda_0$, $\lambda_1$, $\lambda_2$, $\lambda_3$ which are transmitted on the input line I0, and a wavelength which goes to the output line O1 is $\lambda_0$ among the wavelengths $\lambda_0$, $\lambda_1$, $\lambda_2$, $\lambda_3$ which are transmitted on the input line I1.

The barrel shifter is known to those skilled in the art, so only a brief description on the barrel shifter will be given in the following. On the description below, H. Takahashi, et al., "Wavelength MUX and DMUX by using Arrayed Waveguide Grating," IEICE, PST-91-48, pp.41–46 can be refereed to.

The barrel shifter is one of optical devices called "Arrayed Waveguide Grating (AWG)." The conceptual diagram of the AWG is shown in FIG. 31. Generally, the AWG is made as a wavelength multiplexer-and-demultiplexer, and is an integrated on-board circuit which includes input/output waveguides and slab waveguides which act as collimators/light-gathering lenses.

As shown in FIG. 31, the AWG includes a plurality of different-length waveguides which are arranged at regular intervals. Similar to a diffraction grating, phase differences between the waveguides cause dispersion. Therefore, a wavelength-multiplexed signal from the input waveguide is demultiplexed, and the demultiplexed signals are extracted from different output waveguides. If the AWG is used in the reverse direction, the AWG acts as a wavelength multiplexer. Because the slab waveguide has the shape of a sector which has a center of curvature at the endpoint of the waveguide and the axis of the waveguide points to the center of curvature, the slab waveguide has a light-gathering function in a manner similar to a concave mirror. Generally, taper waveguides are inserted between the waveguides and the slab waveguide in order to decrease connection losses.

A wavelength interval $\Delta\lambda$, which is one of the most important parameters in the wavelength multiplexer-and-demultiplexer by using the AWG, is represented as follows:

$$\Delta\lambda = \Delta X/(f \cdot m/n_x \cdot d) \quad (1)$$

$$m = (n_c \cdot \Delta L)/\lambda_0 \quad (2)$$

wherein d is a pitch of the grating of the AWG, $\Delta L$ is a difference of length between the waveguides, f is a focal length (a radius of curvature) of the slab waveguides, $\Delta X$ is an interval between the waveguides, $n_x$ is an effective refractive index of the slab waveguide, the denominator of the right side of the equation (1), $(f \cdot m/n_x \cdot d)$, is a linear dispersion which is a proportionally constant of a relationship between the wavelength and the light-gathering position, $n_c$ is an effective refractive index of the waveguide, $\lambda_0$ is a central wavelength of the AWG and can be obtained from the central output waveguide, and m is a diffraction order indicating the number of wavelengths which represents the amount of the phase difference between the neighboring waveguides. The larger m is, the larger the linear dispersion is. Therefore, signals of many wavelengths the intervals of which are small can be multiplexed-and-demultiplexed as m increases. In other words, the larger m is, the higher the wavelength resolution of the AWG is. Regarding an ordinary diffraction grating, it is necessary to decrease the size of the pitch in order to increase the resolution. Therefore, the resolution is limited by the technology of the pitch making. But, regarding the AWG, a high resolution can be easily realized by increasing the diffraction order by increasing the length of the waveguide. This is the main difference between the AWG and the ordinary diffraction grating.

As shown in the equation (2), a plurality of central wavelengths may exist in the AWG because the m can take any number. For example, in the case of a design in which $\Delta L=126$ $\mu$m and $n_c=1.45$, if m=118, $\lambda_0=1548.3$ nm, and if m=119, $\lambda_0=1535.3$ nm, and a plurality of optical signals which include 1548.3-nm and 1535.3-nm signals are output from the central output port. Here, the bandwidth which can be used without overlapping is 13 nm, and, in the case of a 0.8-nm wavelength-interval WDM (wavelength division multiplexing) technology, the biggest number of wavelengths is "16". As mentioned above, the larger m is, the higher the resolution is, but the narrower the bandwidth which can be used without overlapping is. Therefore, the m needs to be set carefully.

The barrel shifter used here is the AWG which utilizes a characteristic that same wavelength signals per bandwidth which is usable without overlapping are cyclically output as shown in FIG. 32.

FIG. 33 shows an 8-input by 8-output barrel shifter. The barrel shifter can be used for interconnecting the above-mentioned front stage and the back stage, each of which stages includes 8 basic 8×8 switches.

It is necessary to increase the number of ports in order to enlarge further a multistage ATM switch. However, according to the above-mentioned conventional method, the number of the ports is limited by technical limitations and cost increase.

Further, there is a limitation on the number of multiplexed wavelengths when using the barrel shifter. According to the conventional method, only up to $N^2$ ports can be interconnected within an ATM switch by using an N-wavelength-multiplexing technique.

SUMMARY OF THE INVENTION

It is an object of the present invention to provide an ATM switch which is able to expand the scale of the switch without increasing ports of a basic switch and wavelengths for multiplexing, and an ATM switch in which the hardware can be realized at a low cost. It is another object of the present invention to provide an ATM switch in which the size of buffers can be reduced, and a plurality of ATM connections of different ATM service classes are efficiently accommodated. Further, it is an object of the present invention to provide an ATM switch in which congestion of ATM connections rarely occurs. The above objects of the present invention are achieved by an ATM switch including S stages (S is an integer and 2<=S), wherein each stage includes a plurality of basic switches, the ATM switch including:

M×N (each of M and N is an integer) basic switches per each stage; and an interconnecting part for interconnecting between the stages, wherein the M×N basic switches have N groups, and the interconnecting part connects a jth (j is an integer and 1<=j<=N) output port of each basic switch belonging to an ith (i is an integer and 1<=i<=N) group at an (s−1)th (s is an integer and 2<=s<=S) stage to at least one ith input port of the basic switches belonging to a jth group at an sth stage.

The above-mentioned interconnecting part further includes a part, which is provided at each input port, for passing cells that are destined for a desired destination selectively among other cells.

And, the above-mentioned interconnecting part further includes a part, which is provided at each output port, for passing cells that are destined for a desired destination selectively among other cells.

According to the above-mentioned invention, when there are M basic switches in a group, an output port of a basic switch at the (s−1)th stage is connected to an input port of each of M basic switches belonging to a group of basic switches at the sth stage. Therefore, basic switches each of which basic switches has N (the number of groups of a stage) output ports, can be used for the ATM switch. In this way, the ATM switch which has $MN^2$ inputs by $MN^2$ outputs can be realized while each basic switch having N outputs by N outputs. Because an output port of a basic switch at the (s−1)th stage is connected to M input ports, each of which input ports belongs to each of M basic switches in a group at the sth stage, there is a connection relationship of 1:M between the output port and the input ports. In other words, a cell output from the output port is distributed to the M input ports. Therefore, a part for determining whether the distributed cell arriving at a basic switch is destined for the basic switch or not may be provided. The part may receive the cell if the cell is destined for the basic switch and discard the cell if not.

The above-mentioned interconnecting part further includes a part for converting an electronic-signal cell which is output from the output port into a first wavelength-multiplexed optical signal which includes a plurality of optical signals which have different wavelengths and outputting the first wavelength-multiplexed optical signal;

a part for generating a second wavelength-multiplexed optical signal by switching optical signals and outputting the second wavelength-multiplexed optical signal; and a part for converting said second wavelength-multiplexed optical signal into electronic-signal cells and inputting at least one of said electronic-signal cells to said input port.

Accordingly, by connecting basic switches optically, the ATM switch of the invention can be realized easily and at a low cost.

The above-mentioned ATM switch may have a part for converting each electronic-signal cell output from the output port into an optical-signal cell which has a wavelength corresponding to the destination of the electronic-signal cell, so that a basic switch of the receiving side does not need to determine whether the arriving cell is destined for the basic switch.

The above-mentioned ATM switch further includes a speed-conversion part for converting the speed of electronic-signal cells output from the output port. According to the invention, by decreasing the cell transmitting rate, the ATM switch can be realized at a low cost because expensive hardware for high-speed cell transmission is not necessary.

The speed-conversion part may include at least a cell buffer, and a part for controlling the ratio between the writing clock speed of the cell buffer and a reading clock speed of the cell buffer.

Also, the speed-conversion part may include at least a cell buffer, and a part for controlling the ratio between the number of bit expansion data at the input side of the cell buffer and the number of bit expansion data at the output side of the cell buffer.

By decreasing the number of the bit expansion data, the cell transmitting rate can be decreased.

Further, the ATM switch may include a monitoring part for monitoring the arriving rate of the electronic-signal cells output from the output port, and a part for converting the speed of the electronic-signal cells according to the arriving rate.

According to the invention, a burst of cells can be distributed to cells at an average cell rate. Therefore, the capacity of a cell buffer downstream from the cell buffer having the monitoring part can be decreased by avoiding receiving the burst of cells.

The ATM switch may further includes a detecting part for detecting traffic congestion of a route between the basic switches by using the monitored cell rate, and a part for prohibiting the ATM switch from establishing an ATM connection on the route in which the traffic congestion is detected.

According to the invention, discarded cells can be decreased within the ATM switch because an ATM connection is not established on a congested route. The monitoring part and the detecting part may be provided at the input port of the basic switch.

The ATM switch may further include:

a monitoring part for monitoring the residual bandwidth of a port of the basic switch;

a part for sending an RM (Resource Management) cell to a plurality of routes;

a sending-back part for receiving and sending back the RM cell; and a prohibiting part for prohibiting the ATM switch from establishing an ATM connection on a specific route according to the RM cell which is sent back, wherein, if the monitoring part detects that the residual bandwidth is less than a predetermined value, the sending-back part includes information of traffic congestion into the RM cell and sends back the RM cell, and the prohibiting part prohibits the ATM switch from establishing an ATM connection on a route indicated by the content of the RM cell which is sent back.

According to the invention, information of congestion can be transmitted within the ATM switch without using a link specifically for the information. Further, according to the invention, the ATM connections can be controlled within the whole ATM switch, and the destination of the information of congestion can be limited to the input port. Therefore, the transmission can be performed easily.

According to the above-mentioned invention, the ATM switch of $MN^2$ inputs by $MN^2$ outputs can be realized easily and at a low cost without increasing the number of ports of the basic switch and the number of the wavelengths. Further, by decreasing the cell transmission rate using the speed-conversion part, by converting incoming cells at unbalanced intervals into cells at balanced intervals, and by establishing routes according to ATM service classes, and so on, the hardware configuration can be more simple and can be realized at a lower cost.

BRIEF DESCRIPTION OF THE DRAWINGS

Other objects, features and advantages of the present invention will become more apparent from the following detailed description when read in conjunction with the accompanying drawings, in which:

FIG. 2 is a diagram showing connections between basic switches specifically according to an embodiment of the present invention;

FIG. 3 shows a wavelength-exchange table of a barrel shifter;

FIG. 15 is a block diagram of a fourth embodiment of the present invention;

FIG. 16 is a diagram showing an operation of the fourth embodiment of the present invention;

FIG. 32 is a wavelength-exchange table of the barrel shifter;

DETAILED DESCRIPTION OF THE PREFERRED EMBODIMENTS

The general description of an embodiment of the present invention will now be given below with reference to FIG. 1–FIG. 3.

Figure 1:
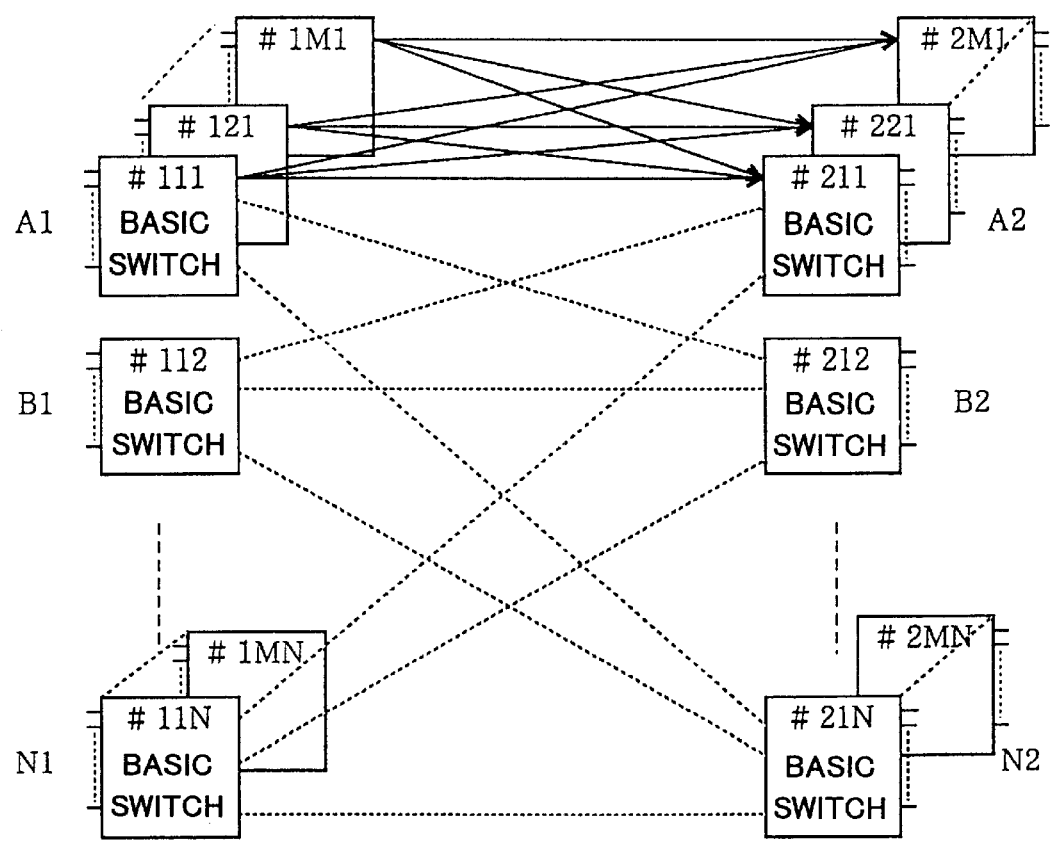
FIG. 1 is a diagram showing logical connections between basic switches according to an embodiment of the present invention.

As shown in FIG. 1, an ATM switch according to the present invention has M×N basic switches #111–#1MN at a front stage and M×N basic switches 1#211–#2MN at a back stage, and each basic switch has N input ports and N output ports. Then, the basic switches #111–#1MN and the basic switches #211–#2MN are interconnected, which results in forming the ATM switch of M×N² inputs by M×N² outputs.

Further, the M×N basic switches #111–#1MN at the front stage are divided into N switch groups A1–N1, where each group has M basic switches, and the M×N basic switches #211–#2MN at the back stage are divided into N switch groups A2–N2, where each group also has M basic switches. Then, a jth (j is an integer and 1<=j<=N) output port of the basic switch #1ki (k is an integer and 1<=k<=M) which belongs to the ith (i is an integer and 1<=i<=N) group of the front stage is connected to ith input ports of each basic switch #2kj which belongs to the jth group of the back stage.

As shown in FIG. 2, which shows the case of M=N=8, the ATM switch includes 512 sender ports 10 each of which sender ports is connected to each output port of each basic switch at the front stage, 512 receiver ports 20, each of which receiver ports is connected to each input port of each basic switch at the back stage, and 64 barrel shifters 30-1 to 30-64, each of which barrel shifters is provided between 8 sender ports connected to the jth output ports of the basic switch #1ki (each of j and k is an integer, 1 j,k 8) belonging to the ith (i is an integer, 1 i 8) group of the front stage and 8 receiver ports connected to ith input ports of the basic switch #2kj belonging to the jth group of the back stage.

The sender port converts an electronic-signal cell sent out from the output port into 8 optical-signal cells having 8 different wavelengths, and wavelength-multiplexes the optical-signal cells into wavelength-multiplexed optical signal. The receiver port demultiplexes the arriving wavelength-multiplexed optical signal into 8 optical-signal cells having 8 different wavelengths, and converts each of the 8 optical-signal cells into an electronic-signal cell. The barrel shifter receives 8 wavelength-multiplexed optical signals from 8 sender ports, and switches wavelengths of the wavelength-multiplexed optical signals, then sends 8 wavelength-switched-optical signals to the 8 receiver ports. FIG. 3 shows a wavelength switching table.

As shown in FIG. 2, 8×8 (8-input by 8-output) basic switches #111–#288 are interconnected by using 8×8 (8-input by 8-output) barrel shifters 30–1 to 30–64. In other words, 64 basic switches #111–#188 of the front stage and 64 basic switches #211–#288 of the back stage are interconnected by using 64 barrel shifters 30-1 to 30-64. The basic switches #111–#188 are divided into 8 groups (A1–H1), each of which groups includes 8 basic switches, and the basic switches #211–#288 are similarly divided into 8 groups (A2–H2), each of which groups includes 8 basic switches.

A cell which is entered into an input port of a basic switch at the front stage is routed to one of the groups (A2–H2) at the back stage according to the position of the output port of the basic switch at the front stage, where the cell routes through the output port. In other words, by determining the position of the output port, one of the groups (A2–H2) of the basic switches #211–#288 at the back stage can be selected for the cell.

A wavelength-multiplexed optical signal which includes 8 wavelengths is sent out from the sender port which is connected to the jth output port of the basic switch #1ki at the front stage, and the wavelength-multiplexed optical signal is entered into the barrel shifter 30-((j−1)×8+i). Then, optical signals of the wavelength-multiplexed optical signal are switched according to wavelength within the barrel shifter according to the table shown in FIG. 3 and divided into 8 wavelength-multiplexed optical signals. After that, the 8 wavelength-multiplexed optical signals are sent to the basic switches #21j–#28j at the back stage respectively. Finally, each of the receiver ports 20 connected to the input ports of the basic switches #21j–#28j receives one of the 8 wavelength-multiplexed optical signals.

First Embodiment

Figure 4:
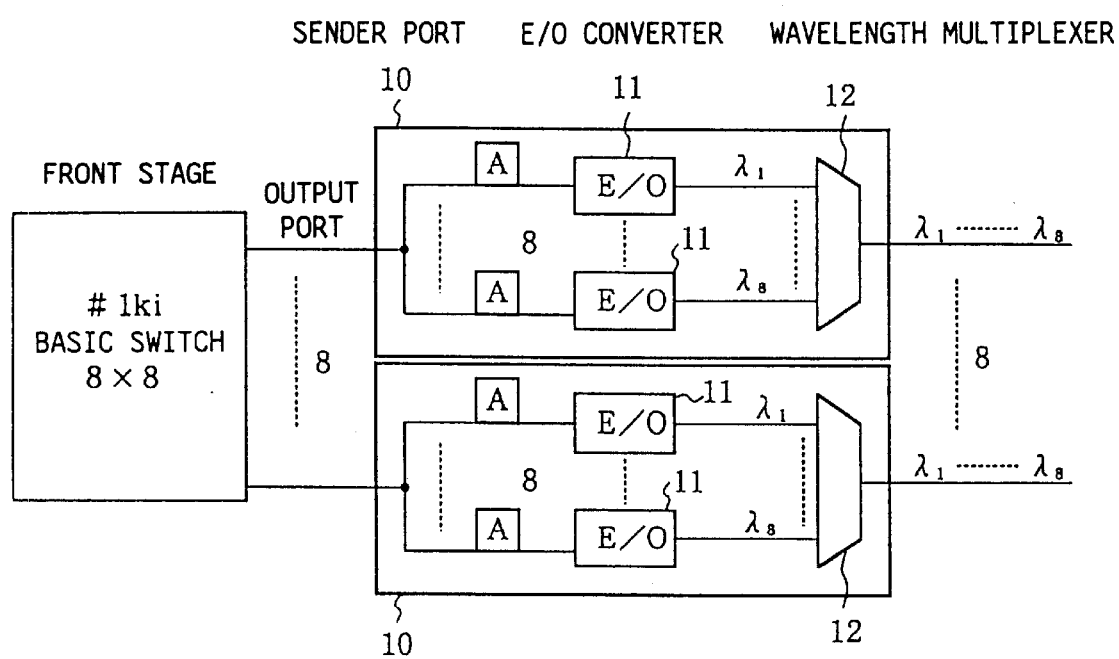
FIG. 4 is a block diagram of sender ports according to a first embodiment of the present invention.

In the following, a first embodiment of the present invention will be described with reference to FIG. 4. FIG. 4 is a block diagram of sender ports according to the first embodiment of the present invention. As described before, the sender port converts an electronic-signal cell sent out from the output port into 8 optical-signal cells having 8 different wavelengths, wavelength-multiplexes the optical-signal cells into wavelength-multiplexed optical signal, and then outputs the signal through an optical fiber.

As shown in FIG. 4, the electronic-signal cell sent out from the output port of the basic switch #1ki at the front stage is divided into 8 electronic-signal cells after entering into the sender port 10, and each of the 8 electronic-signal cells is converted into the optical-signal cell having its own wavelength by an E/O converter 11. The 8 optical-signal cells are wavelength-multiplexed by a wavelength multiplexer 12, and then the wavelength-multiplexed optical signal is sent out through the optical fiber.

In the embodiment, a laser diode is used for the E/O converter 11, but various known converters can be used. For the 8-wavelength multiplexer 12, various known multiplexers can be used.

Figure 5:
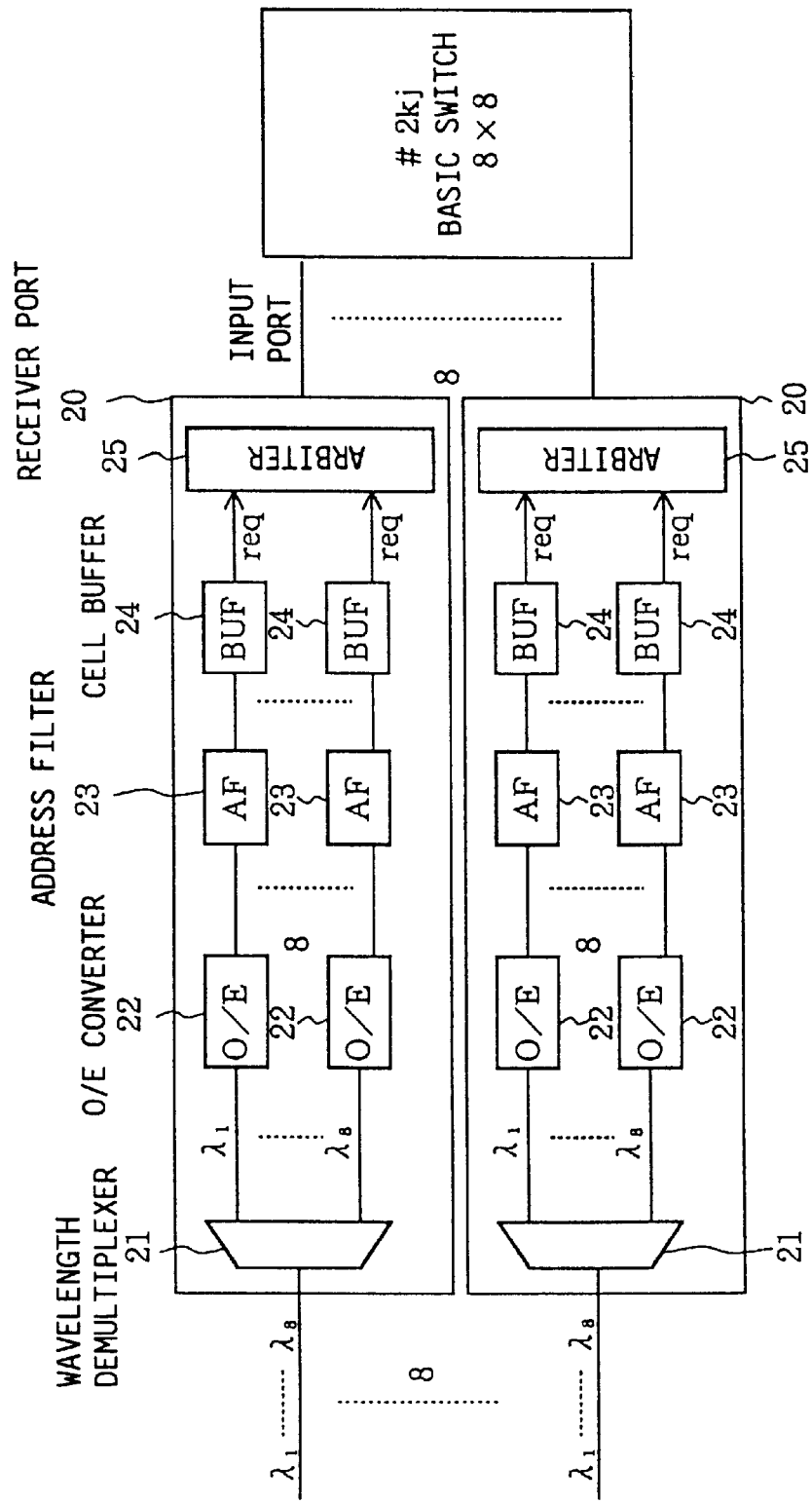
FIG. 5 is a block diagram of receiver ports according to the first embodiment of the present invention.

The receiver port of the first embodiment of the present invention will be described below with reference to FIG. 5. FIG. 5 is a block diagram of the receiver ports. As described before, the receiver port demultiplexes the arriving 8-wavelength-multiplexed optical signal into 8 optical-signal cells having 8 different wavelengths, converts the 8 optical-signal cells into 8 electronic-signal cells, and then selects a cell destined for the connected input port of the basic switch #2kj among the 8 cells and sends out the selected cell to the input port.

The receiver port includes an 8-wavelength demultiplexer 21, O/E converters 22, address filters 23, cell buffers 24, and a cell-arbiter 25. Various known wavelength demultiplexers can be used for the wavelength demultiplexer 21. A laser diode is used for the O/E converter 22 in the embodiment, but various converters can be used.

As shown in FIG. 5, the incoming 8-wavelength-multiplexed optical signal is wavelength-demultiplexed into 8 optical-signal cells having 8 different wavelengths by the wavelength demultiplexer 21, and the optical-signal cells are converted into electronic-signal cells by the O/E converters 22, then a cell destined for the connected input port of the basic switch #2kj is selected by the address filters 23 among the cells. The selected cell is stored in the cell buffer 24, and, then, the cell-arbiter 25 arbitrates the cell buffers 24 and sends out the cell to the input port of the basic switch #2kj at the back stage.

For example, as shown in FIG. 2, among outgoing cells at the basic switch #118, a cell which is destined for the basic switch #211, which cell is outgoing from a port which is destined for group A2, determines the port by checking out routing-bits within the cells. The top port of the basic switch #118 shown in FIG. 2 corresponds to the port. The cell sent from the top port is divided into 8 signals each of which has a different wavelength at the barrel shifter, the 8 signals go to the bottom input ports of the 8 basic switches #211–#281, and, then, only the basic switch #211 gets the cell through the address filter 23.

Second Embodiment

Figure 6:
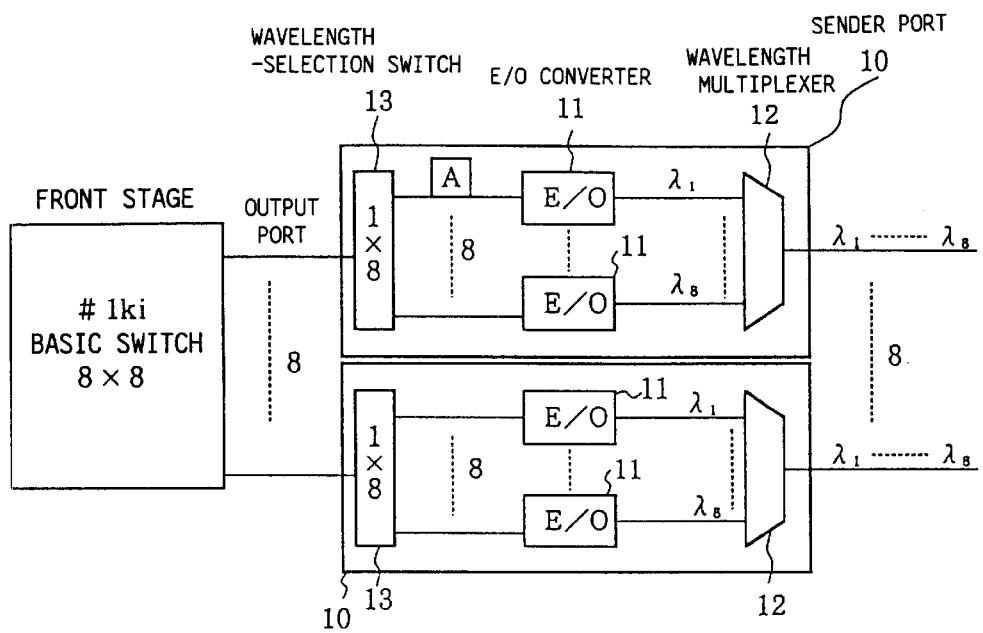
FIG. 6 is a block diagram of sender ports according to a second embodiment of the present invention.

In the following, the sender port of a second embodiment of the present invention will be described with reference to FIG. 6. FIG. 6 is a block diagram of sender ports according to the second embodiment of the present invention. As shown in FIG. 6, the sender port has a wavelength-selection switch 13 for selecting a wavelength by which the electronic-signal cell incoming from the connected output port of the basic switch #1ki is converted into the optical-signal cell. After receiving the electronic-signal cell, the wavelength-selection-switch 13 reads information of the destination of the cell, and, then, the wavelength-selection-switch 13 outputs the cell to the E/O converter 11 which uses a wavelength corresponding to the destination. In this way, the electronic-signal cell is converted to an optical-signal cell having the wavelength corresponding to the desired destination.

Figure 7:
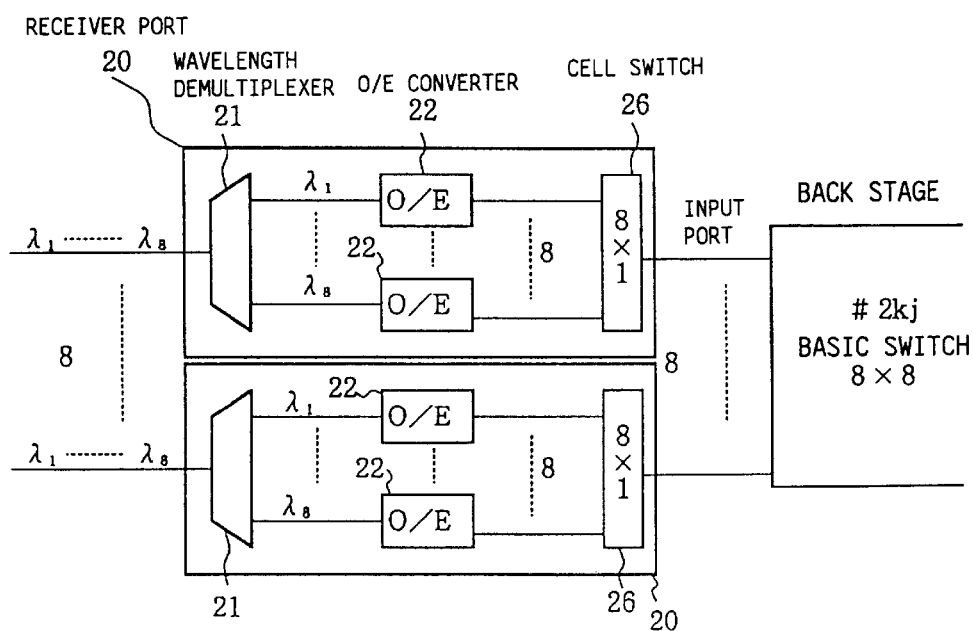
FIG. 7 is a block diagram of receiver ports according to the second embodiment of the present invention.

In the following, the receiver port of the second embodiment of the present invention will be described with reference to FIG. 7. FIG. 7 is a block diagram of the receiver ports according to the second embodiment of the present invention. As shown in FIG. 7, the incoming 8-wavelength multiplexed optical signal is wavelength-demultiplexed into 8 optical-signal cells having 8 different wavelengths by the wavelength-demultiplexer 21, and the optical-signal cells are converted into electronic-signal cells by the O/E converters. Different from the above-mentioned first embodiment, a wavelength corresponding to a cell's destination has been assigned to each cell. In other words, only cells destined for an input port to which the receiver port is connected enter into the receiver port. Therefore, the cell switch 26 simply outputs the electronic-signal-sells in sequence to the input port.

For example, as shown in FIG. 2, among outgoing cells at the basic switch #118, a cell which is destined for the basic switch #211, determines a port which is destined for group A2 by checking out its routing-bits within the cells. Further, within the sender port 10, a wavelength λ1 which is used for a channel to the basic switch #211 of the group A2 is assigned to the cell. Then, the cell converted into an optical-signal cell of the wavelength λ1 is routed to the basic switch #211.

Third Embodiment

Figure 8:
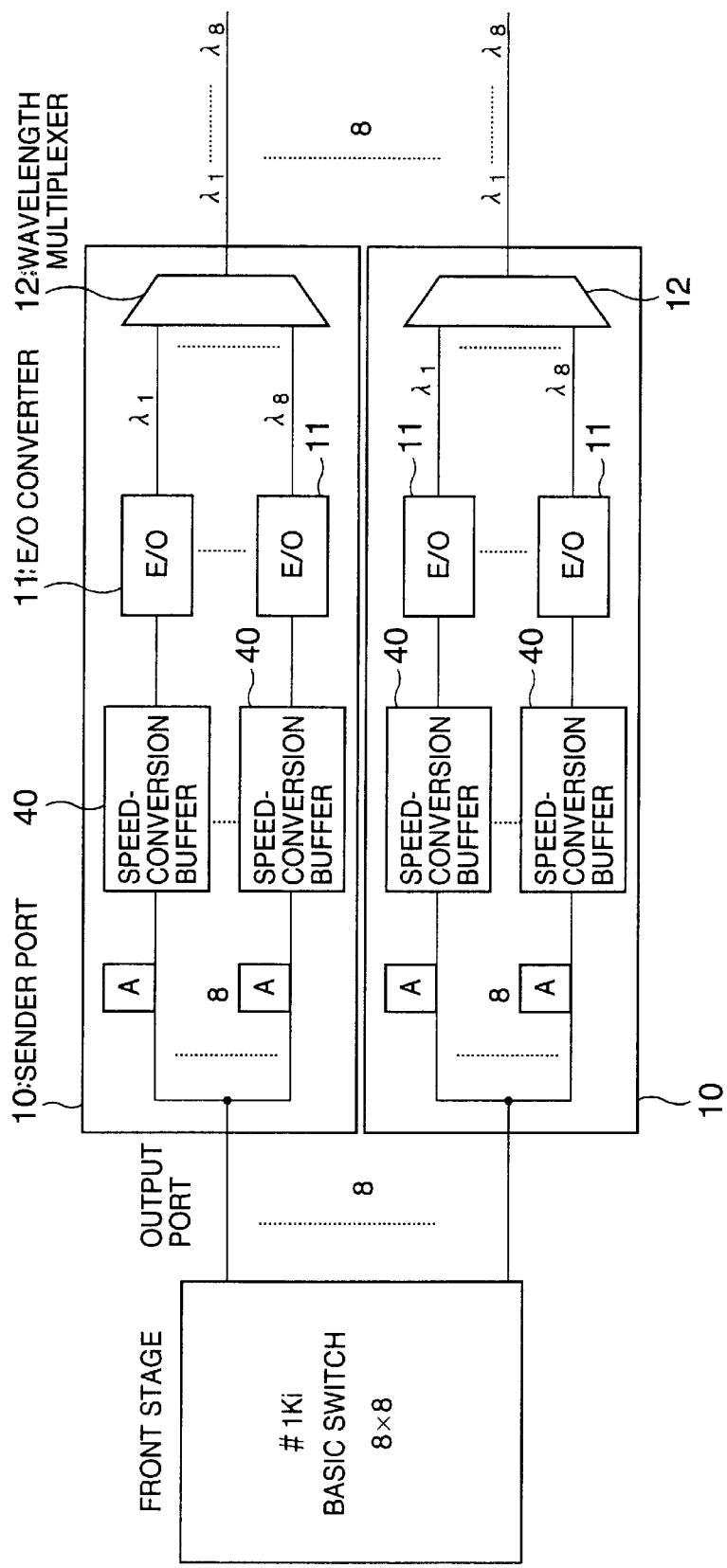
FIG. 8 is a block diagram of sender ports according to a third embodiment of the present invention.
Figure 9:
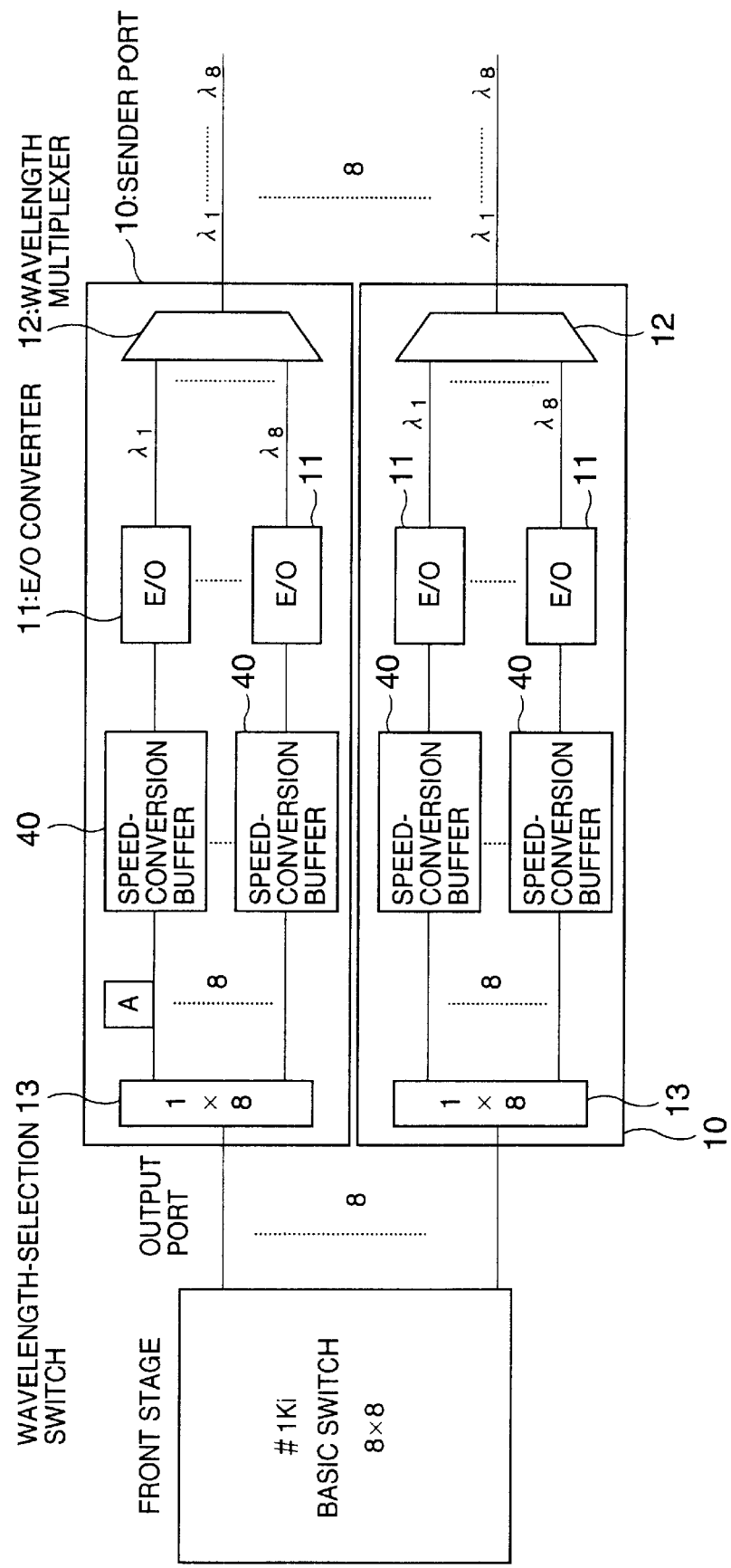
FIG. 9 is a block diagram of sender ports according to the third embodiment of the present invention.

A third embodiment of the present invention will be described with reference to FIG. 8–FIG. 14. As shown in FIG. 8 and FIG. 9, in the third embodiment, the sender port 10 has speed-conversion buffers 40. FIG. 8 shows the sender port which includes the speed-conversion-buffers 40 in the sender port of the first embodiment, and FIG. 9 shows the sender port which includes the speed-conversion-buffers 40 in the sender port of the second embodiment.

Figure 10:
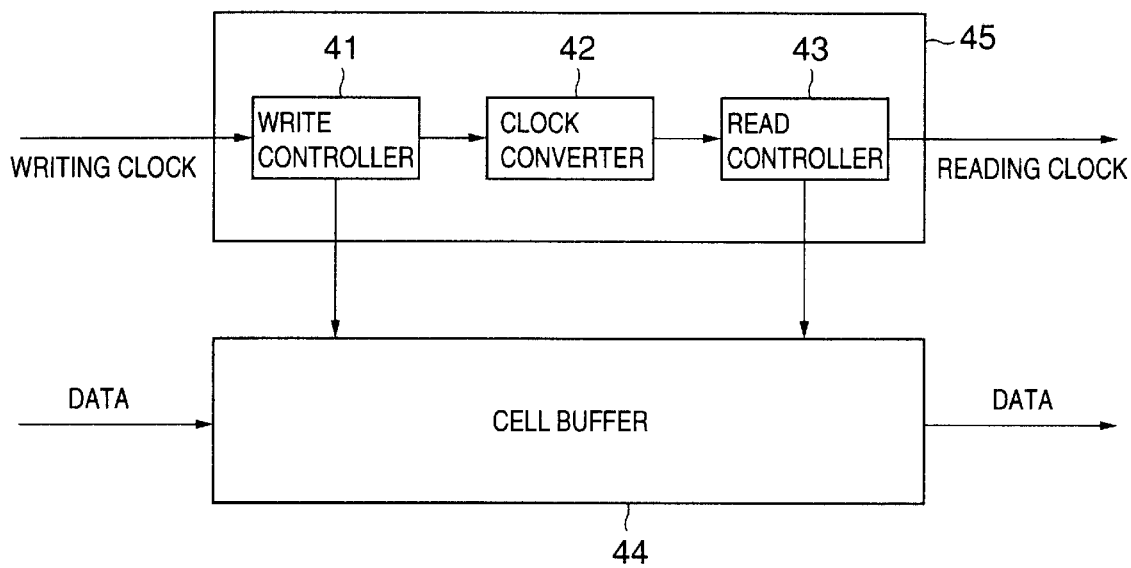
FIG. 10 is a block diagram of a speed-conversion buffer.

As shown in FIG. 10, the speed-conversion-buffer includes a write controller 41, a clock converter 42, a read controller 43 and a cell buffer 44. The transmission rate of the cells written into and read out of the cell buffer 44 is converted by controlling a writing clock and a reading clock.

Figure 11:
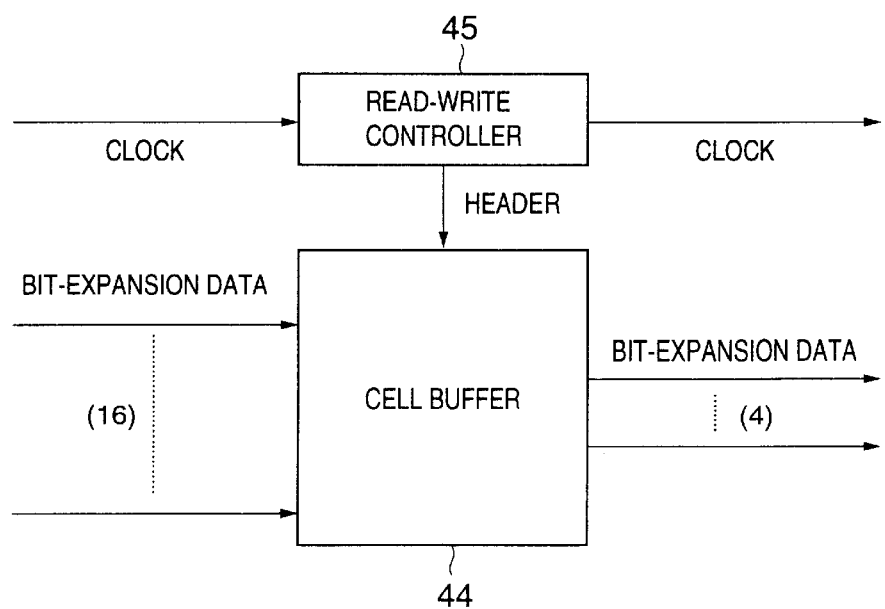
FIG. 11 is a block diagram of another embodiment of the speed-conversion buffer.

Another example of the speed-conversion-buffer 40, as shown in FIG. 11, includes a read-write controller 45 and the cell buffer 44. In this case, the transmission rate of the cells is converted by controlling the number of bit expansion data at the input side and the output side of the cell buffer 44. More precisely, the read-write controller 45 replaces headers of incoming 16 bit expansion data with new headers, then, 4 bit expansion data is sent out from the cell buffer 44, and, as a result, the rate is converted.

By decreasing the rate of the cells in this way, an ATM switch can be realized at a low cost without using any hardware for a high-speed cell transmission.

Figure 12:
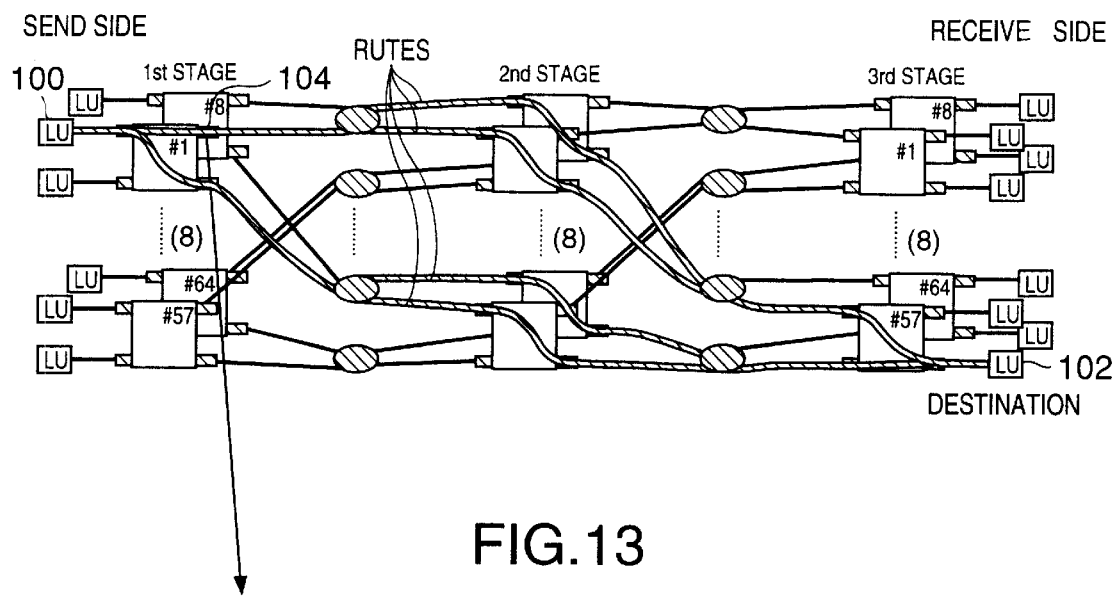
FIG. 12 is a diagram of an example of a 3-stage ATM switch.

Further explanation on the speed-conversion buffer 40 will be given below with reference to FIG. 12. FIG. 12 is a diagram of a 3-stage ATM switch according to an embodiment of the present invention. One of the reasons for increasing the number of stages is that the number of available connections increases so as to distribute cell-traffic within the ATM switch.

In the 3-stage-ATM switch, it is possible to select a route among various routes per each ATM connection. For example, an ATM cell sent out from line unit (LU) 100 is transferred to an LU102 through one of a plurality of routes shown in FIG. 12. Here, the ATM connections are configured so as to equalize the cell rate of each wavelength channel. For example, if the bandwidth of a port is 10 Gbps, the equalized average cell rate at which each wavelength signal transmits the cells is 1.25-Gbps. The configuration will be described more precisely later.

Figure 13:
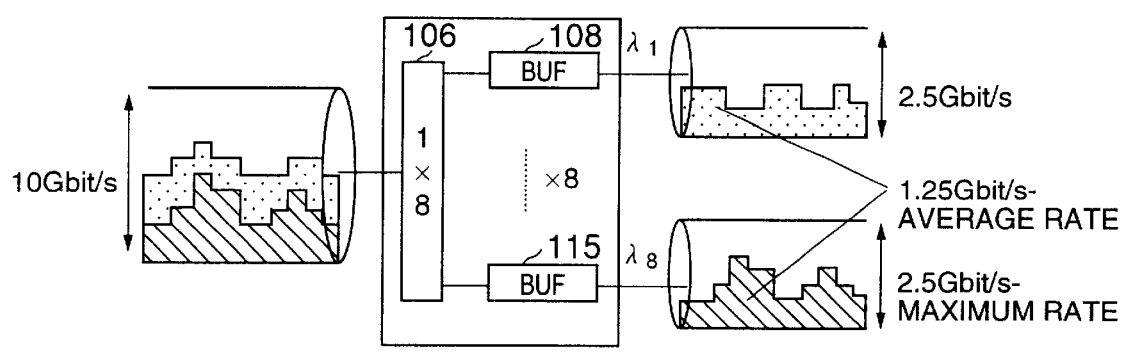
FIG. 13 is a diagram of a sender port of the 3-stage ATM switch.

FIG. 13 shows a part of the output port 104 shown in FIG. 12. Also, the figure shows a part of the wavelength-selection switch and the speed-conversion buffer of the sender port shown in FIG. 9. As shown in FIG. 13, an incoming signal at a rate of 10 Gbps is divided, and the divided signals are entered into each of buffers 108–115. At each of buffers 108–115, the rate of each signal is converted in the above-mentioned way, and goes out at a rate of 2.5 Gbps.

Figure 14:
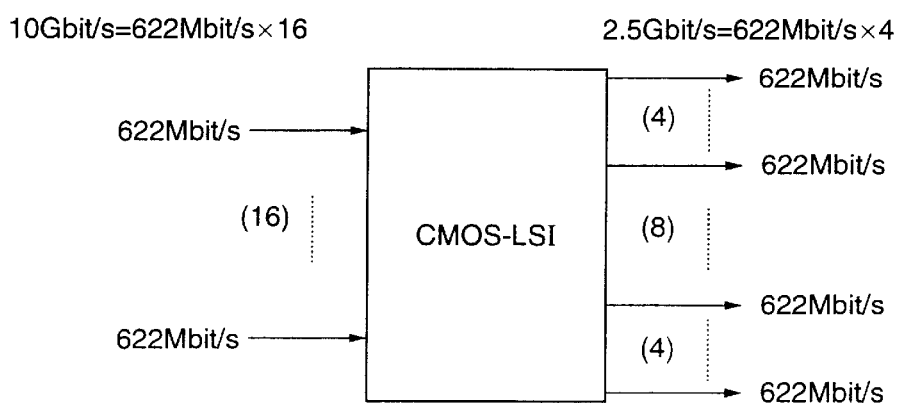
FIG. 14 is a diagram showing the sender port realized by a CMOS-LSI.

The configuration shown in FIG. 13 can be realized by a CMOS LSI circuit, for example, in FIG. 14, 622 Mbps×16 parallel signals(=10 Gbps) are entered into the CMOS LSI circuit, and then, 622-Mbps×4 parallel signals(=2.5 Gbps) per cell buffer are output, which is also shown in the above-mentioned FIG. 11.

Fourth Embodiment

A fourth embodiment of the present invention will now be described with reference to FIG. 15 and FIG. 16. FIG. 15 is a block diagram of the speed-conversion buffer of the fourth embodiment of the present invention and FIG. 16 is a diagram showing an operation of the fourth embodiment of the present invention.

As shown in FIG. 15, a traffic monitor 46 is provided at the input side of the cell buffer 44. The traffic monitor 46 monitors the rate of the incoming cells and sends cell rate information to the read-write controller 45. According to the cell rate information, the read-write controller 45 converts the rate of the cells in such a way described in the third embodiment.

Therefore, as shown in FIG. 16, if the cells arrive at unbalanced intervals within a unit time, the traffic monitor detects the unbalance, and, then, the read-write controller 45 controls the rate of the cells so that the cell buffer 44 sends the cells at balanced intervals. As a result, the buffer capacity of the cell buffer 24 of the receiver port 20 which receives the cells from the sender port 10 having the speed-conversion-buffer 40 can be decreased.

Fifth Embodiment

Figure 17:
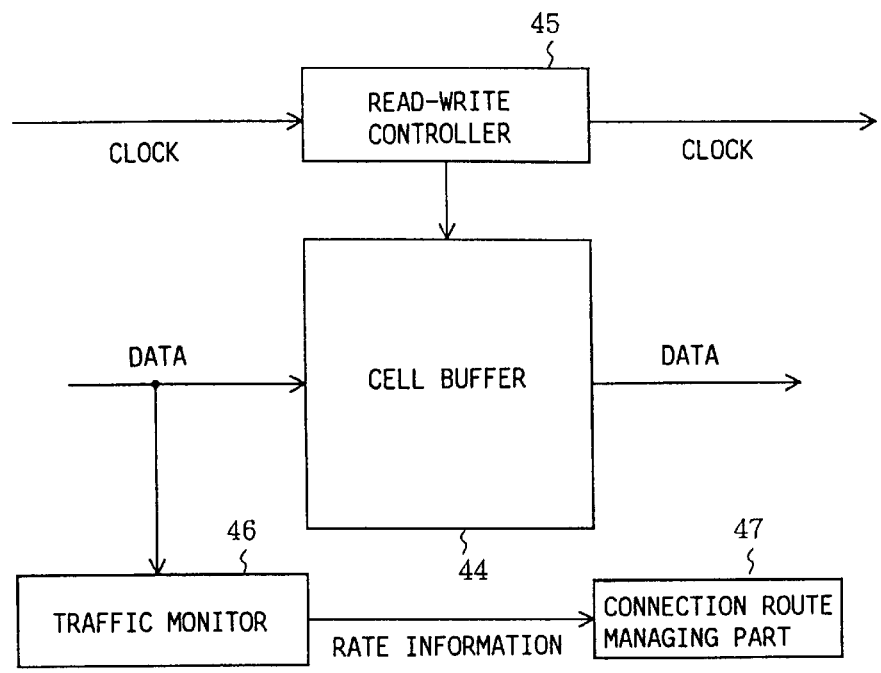
FIG. 17 is a block diagram of a fifth embodiment of the present invention.
Figure 18:
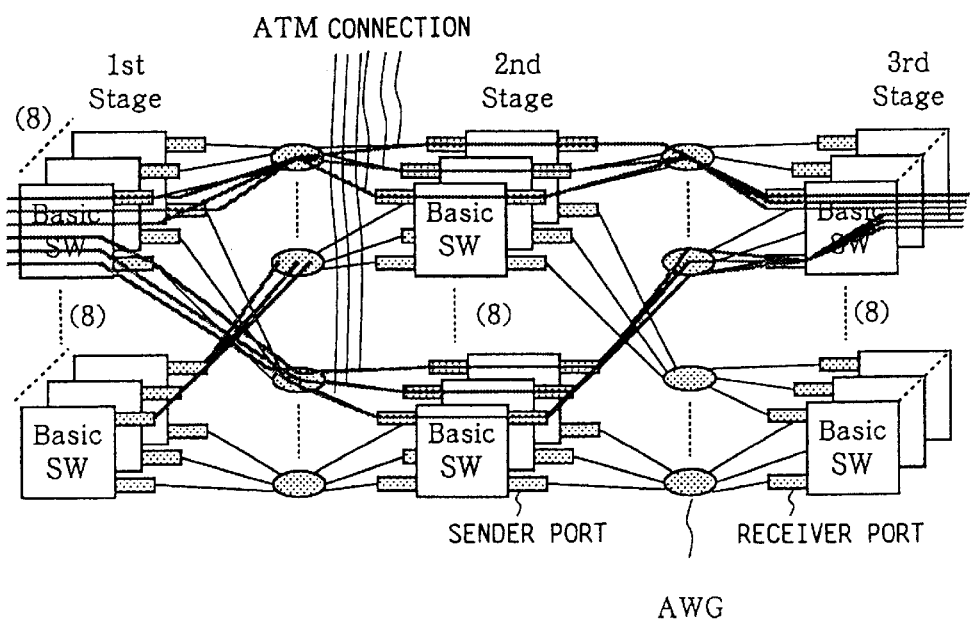
FIG. 18 is a diagram showing a 3-stage ATM switch according to the fifth embodiment of the present invention.

A fifth embodiment of the present invention will now be described with reference to FIG. 17 and FIG. 18. FIG. 17 is a block diagram of the fifth embodiment of the present invention and FIG. 18 is a diagram showing a 3-stage ATM switch according to the fifth embodiment of the present invention. As shown in FIG. 17, a connection-route managing part 47 which is connected to the traffic monitor 46 is provided. In the embodiment, the above-mentioned cell rate information is sent to the connection-route managing part 47 from the traffic monitor 46, and the connection-route-managing-part 47 manages the configuration of each connection within the ATM switch. According to the cell rate information, the connection-route-managing-part 47 manages the traffic so that the cells are distributed equally to each ATM connection within the ATM switch. Therefore, the rate of the cells can be decreased as a whole because the cells are not gathered intensively at a few ATM connections. According to the above configuration, by decreasing the rate of the cells, an ATM switch can be realized at a low cost without using any hardware for a high-speed cell transmission.

As shown in FIG. 18, the cells within a multistage (in this case, 3-stage) ATM switch can be distributed among the ATM connections by performing the configuration management of the ATM connections with the traffic monitor 46 and the connection-route managing part 47 being provided, for example, at each sender port.

Sixth Embodiment

Figure 19:
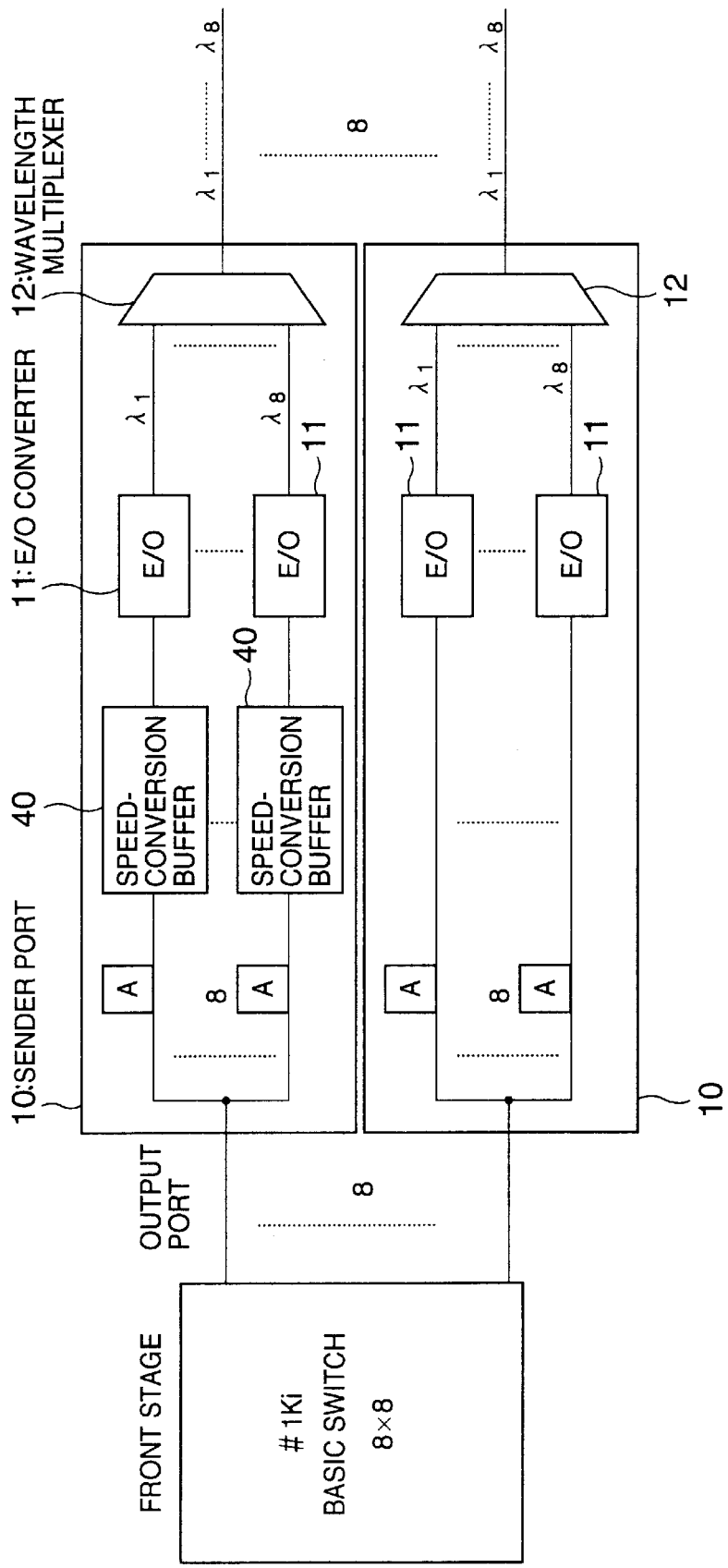
FIG. 19 is a block diagram of sender ports according to a sixth embodiment of the present invention.
Figure 20:
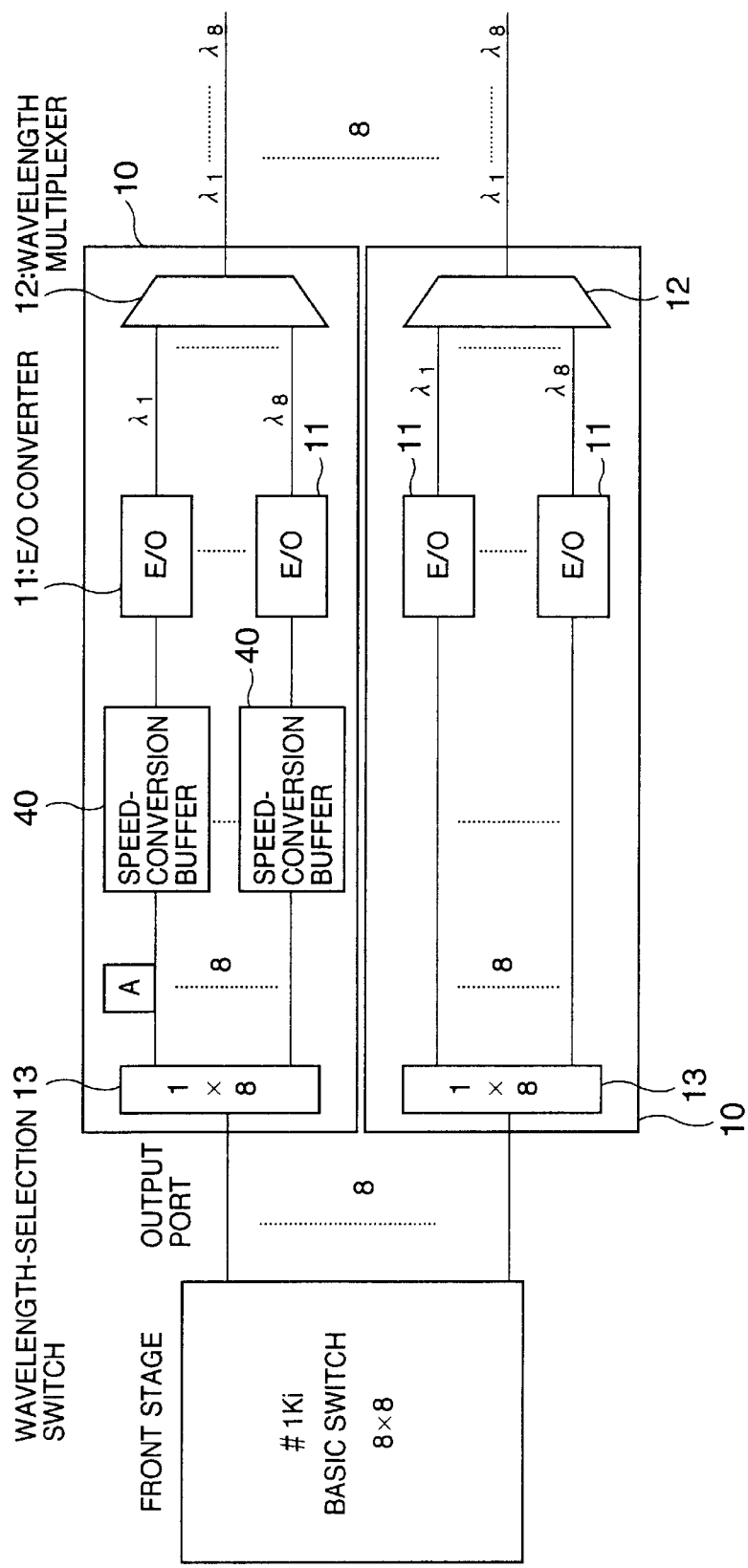
FIG. 20 is a block diagram of another example of sender ports according to the sixth embodiment of the present invention.
Figure 21:
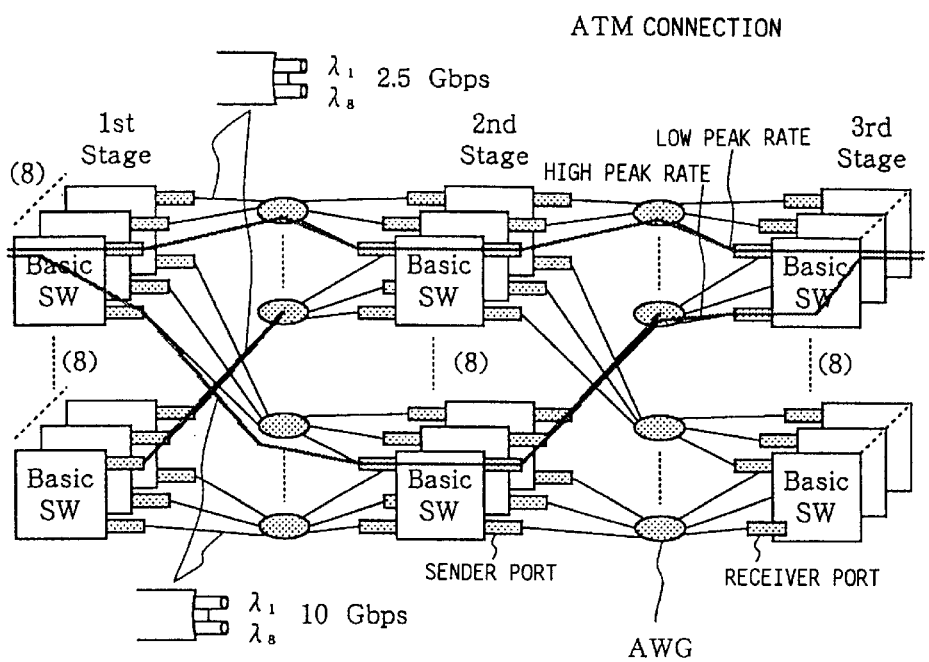
FIG. 21 is a diagram showing a 3-stage ATM switch according to the sixth embodiment of the present invention.

A sixth embodiment of the present invention will now be described with reference to FIG. 19–FIG. 21. In the sixth embodiment, as shown in FIG. 19 and FIG. 20, at least one sender port that has the speed-conversion buffer 40 (hereinafter, called a first sender port) is used in combination with at least one sender port that does not have it (hereinafter, called a second sender port), in which the sum of the number of the sender ports is 8, which sender ports are to be connected to a basic switch at the front stage. According to the sixth embodiment, it is possible to set up high-speed routes and low-speed routes beforehand as necessary, by using the second sender port for the high-speed route and using the first sender port for the low-speed route. In this case, an ATM connection transmitting cells at a high peak cell rate uses the high-speed route, and an ATM connection transmitting cells at a low peak cell rate uses the low-speed route. Therefore, as shown in FIG. 21, even in the case of various existing cell rates each of which rates is different according to an ATM service class, by setting up routes according to the cell rates, an ATM switch being adapted efficiently to various ATM service classes can be realized.

Seventh Embodiment

Figure 22:
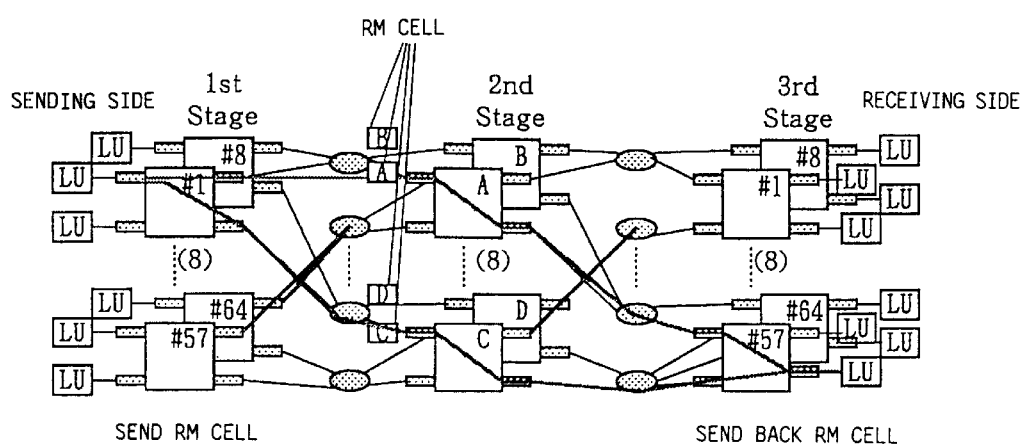
FIG. 22 is a diagram of a 3-stage ATM switch for explaining transmission of RM cells within the 3-stage ATM switch.

A seventh embodiment of the present invention will now be described with reference to FIG. 22. FIG. 22 is a diagram of a 3-stage ATM switch for explaining transmission of RM (Resource Management) cells within the 3-stage-ATM switch. In the seventh embodiment, as shown in FIG. 22, the 3-stage-ATM switch has line units (LUs) connected to each input port of each basic switch at the first stage and to each output port of each basic switch at the third stage on a one-by-one basis. A line unit at the first stage periodically sends the RM cells to a line unit at the third stage through various routes, and, then, after it receives the RM cells, it sends back the RM cells to the line unit at the first stage. By including the cell rate information generated by the traffic monitor 46 shown in FIG. 17 to the RM cell and by sending it, the connection-route managing part 47 at each basic switch on each route can obtain information on the incoming cell rate of each basic switch.

Therefore, in the seventh embodiment, every basic switch associated with an ATM connection can distribute the cells of the ATM connection equally to various routes in close liaison with each other, which is different from in the case of the fifth embodiment in which each basic switch autonomously distributes the cells of an ATM connection associated with the basic switch.

Eighth Embodiment

Figure 23:
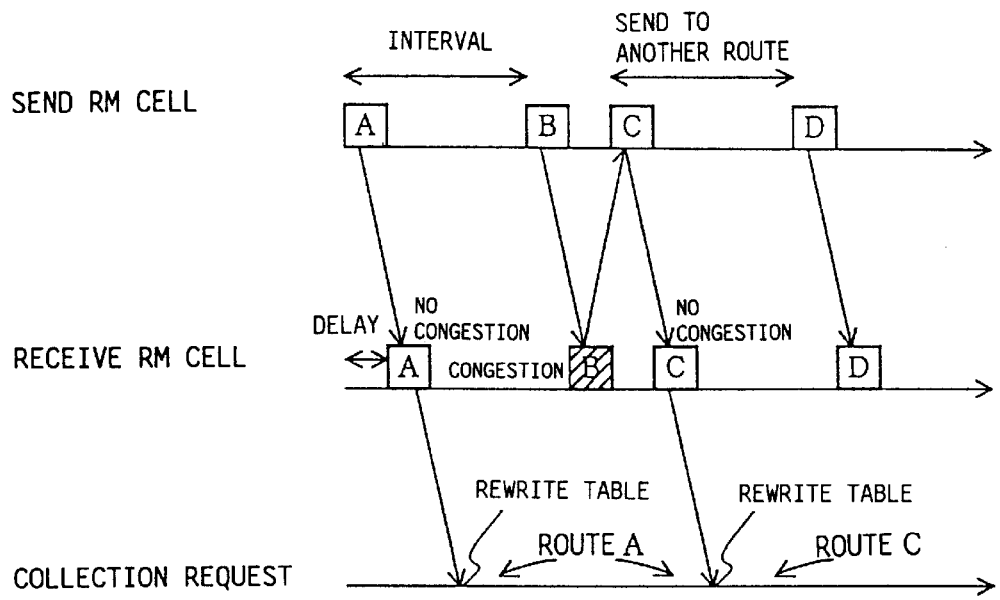
FIG. 23 is a diagram for explaining route management of ATM connections at a line unit.
Figure 25:
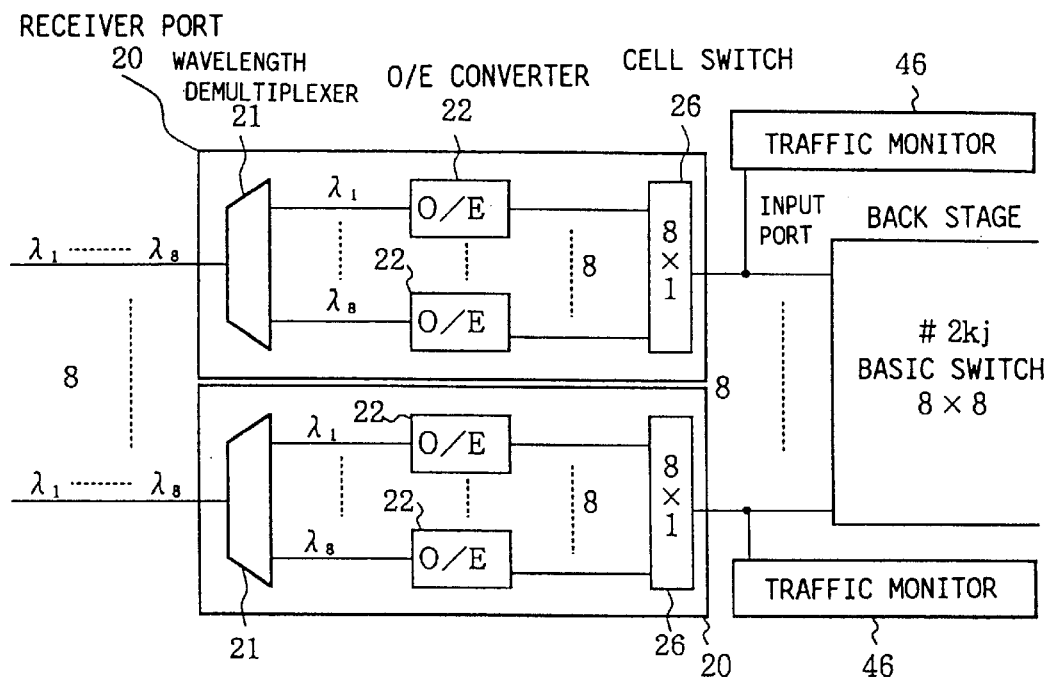
FIG. 25 is a block diagram of traffic monitors which are provided at input ports.

An eighth embodiment of the present invention will be described with reference to FIG. 23. FIG. 23 is a diagram for explaining route management Further, as shown in FIG. 25, the traffic monitor may be provided at an input port side of the back stage. In this case, a congested condition of a route also can be detected as in the case of providing the traffic monitor at an output port side as shown in FIG. 17.

Tenth Embodiment

Figure 26:
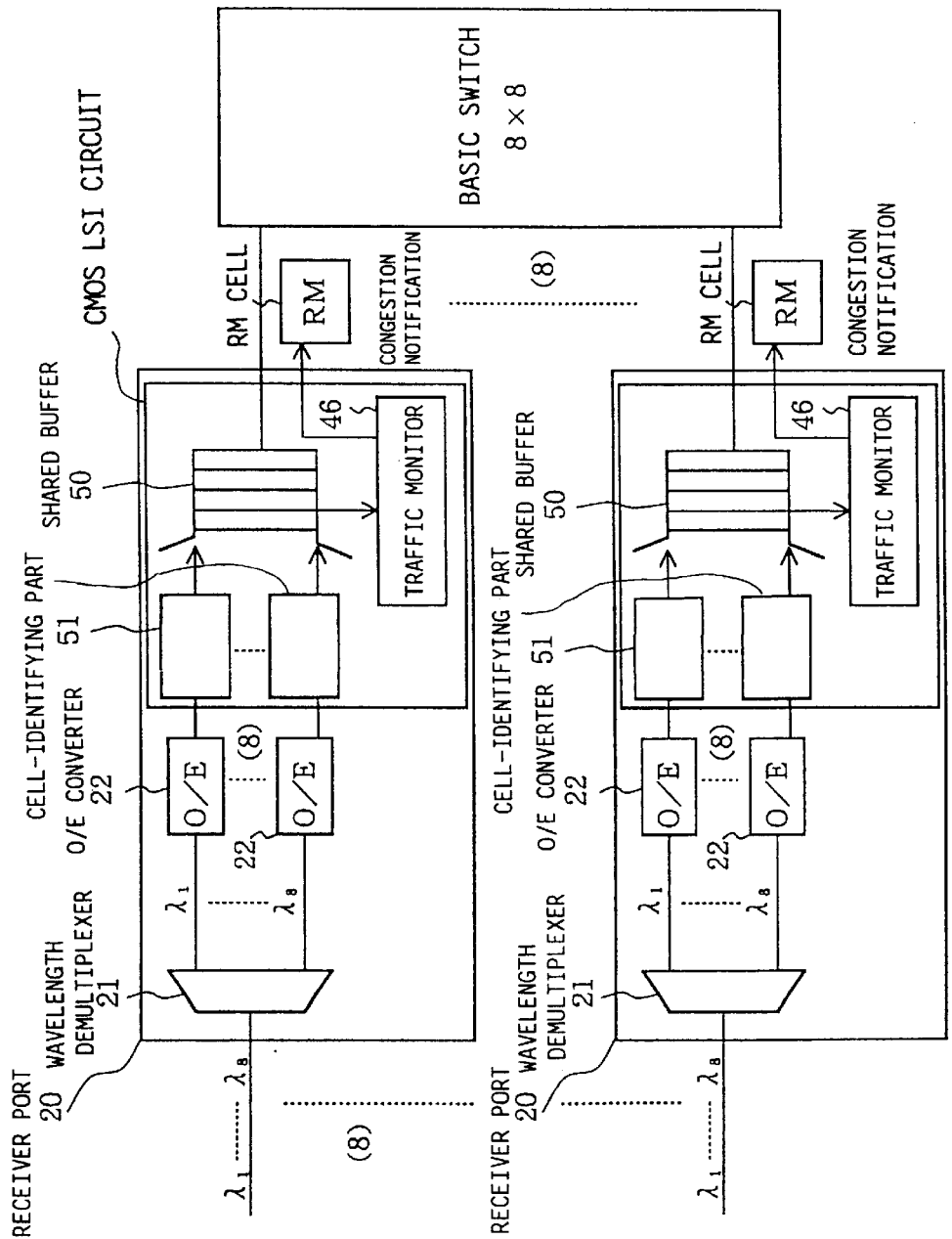
FIG. 26 is a block diagram of CMOS-LSI receiver ports.
Figure 27:
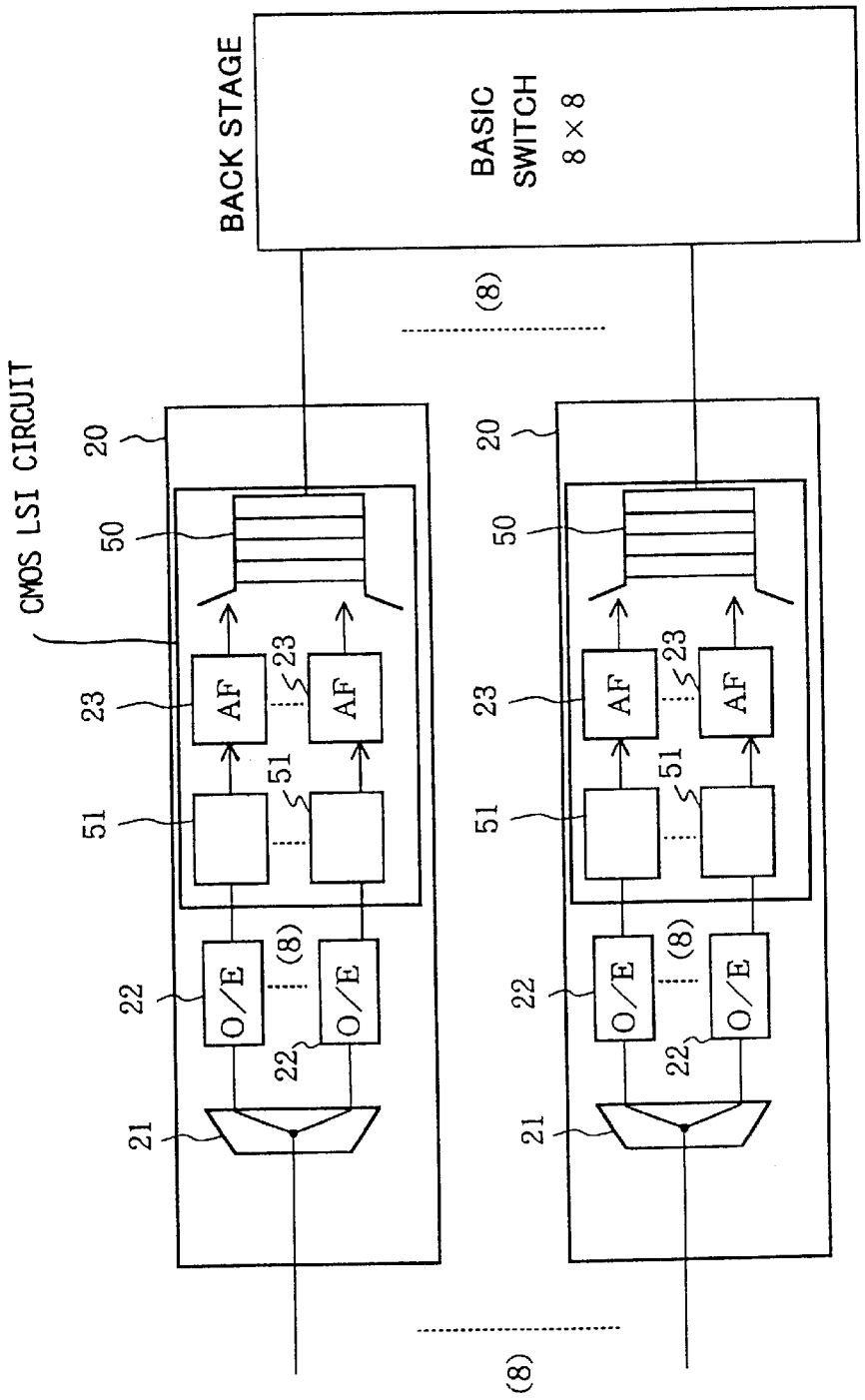
FIG. 27 is a block diagram of another example of CMOS-LSI receiver ports.
Figure 28:
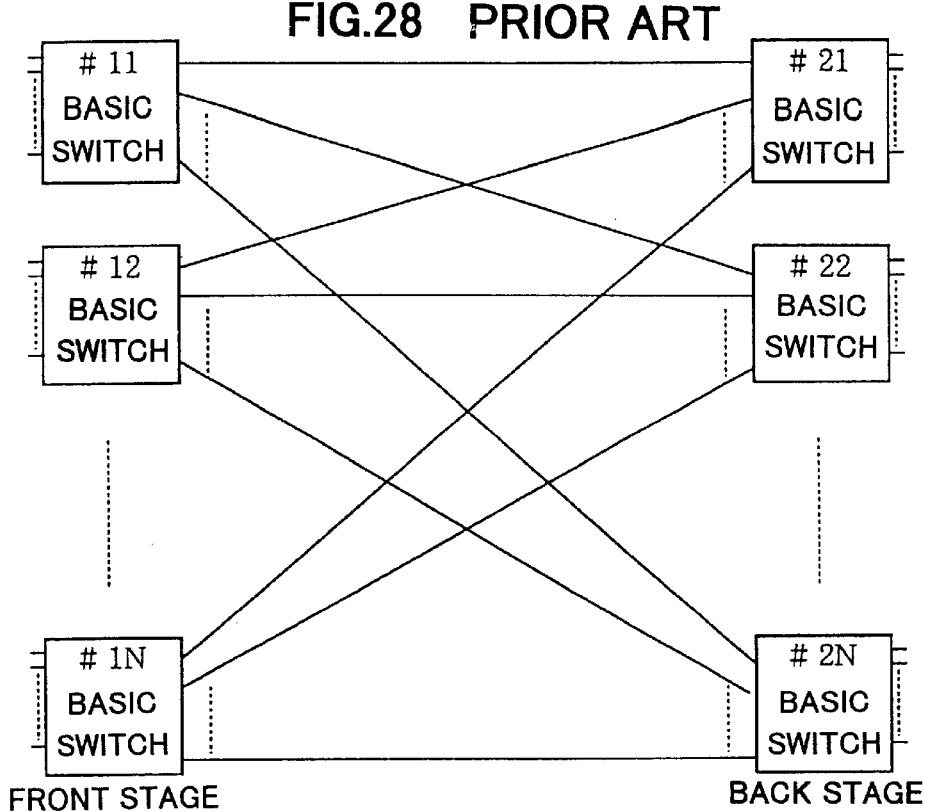
FIG. 28 is a block diagram of a multistage ATM switch in which basic switches are interconnected.
Figure 29:
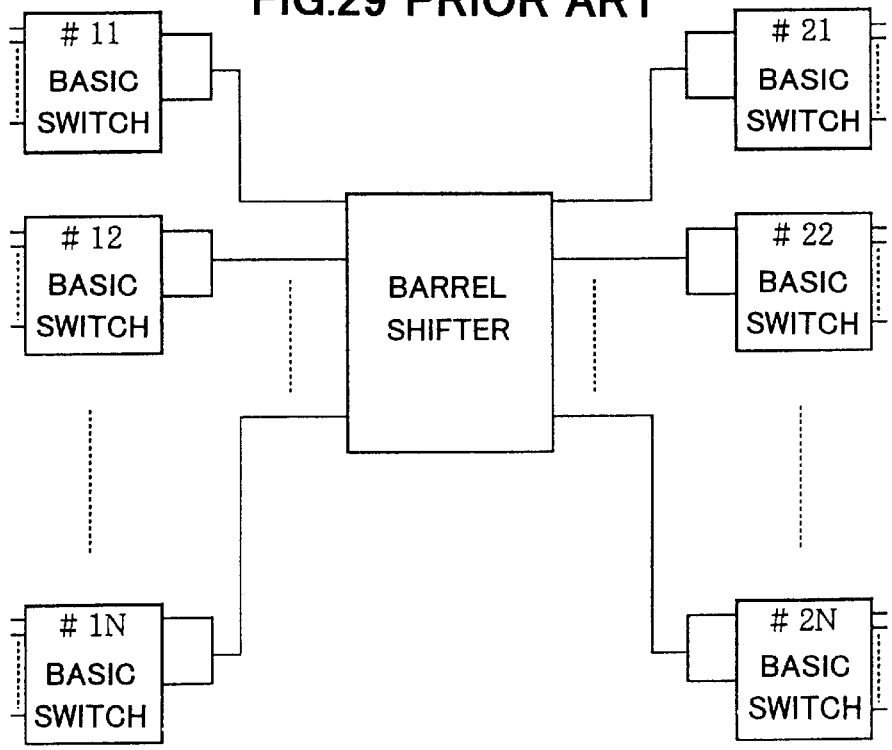
FIG. 29 is a block diagram of a multistage ATM switch in which basic switches are interconnected by a barrel shifter.
Figure 30:
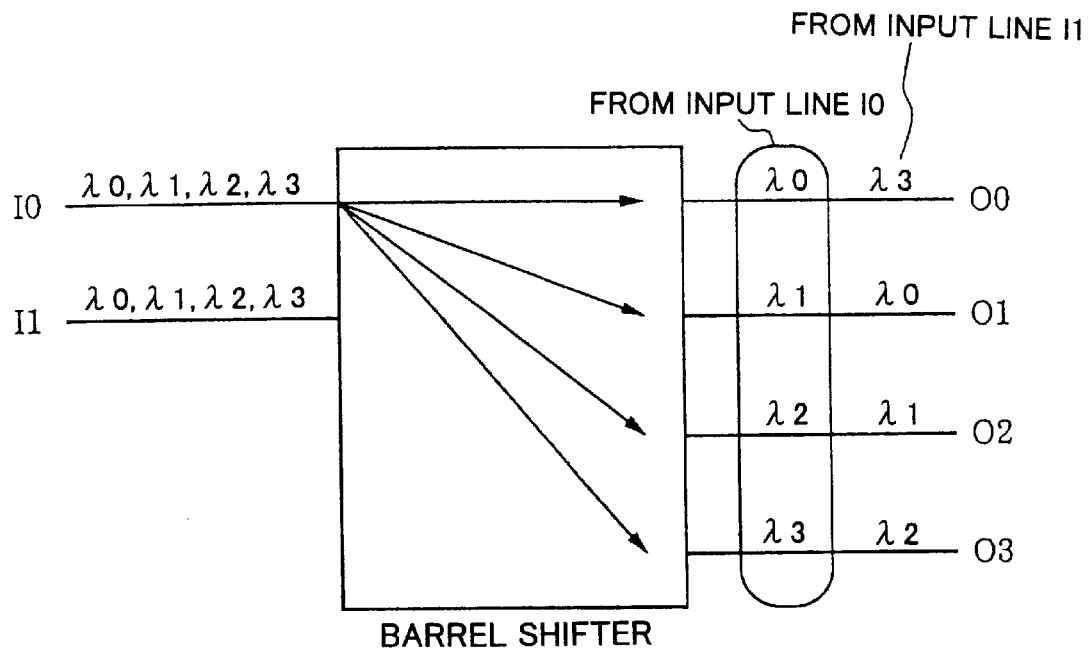
FIG. 30 is a diagram showing how optical signals are switched within the barrel shifter.
Figure 31:
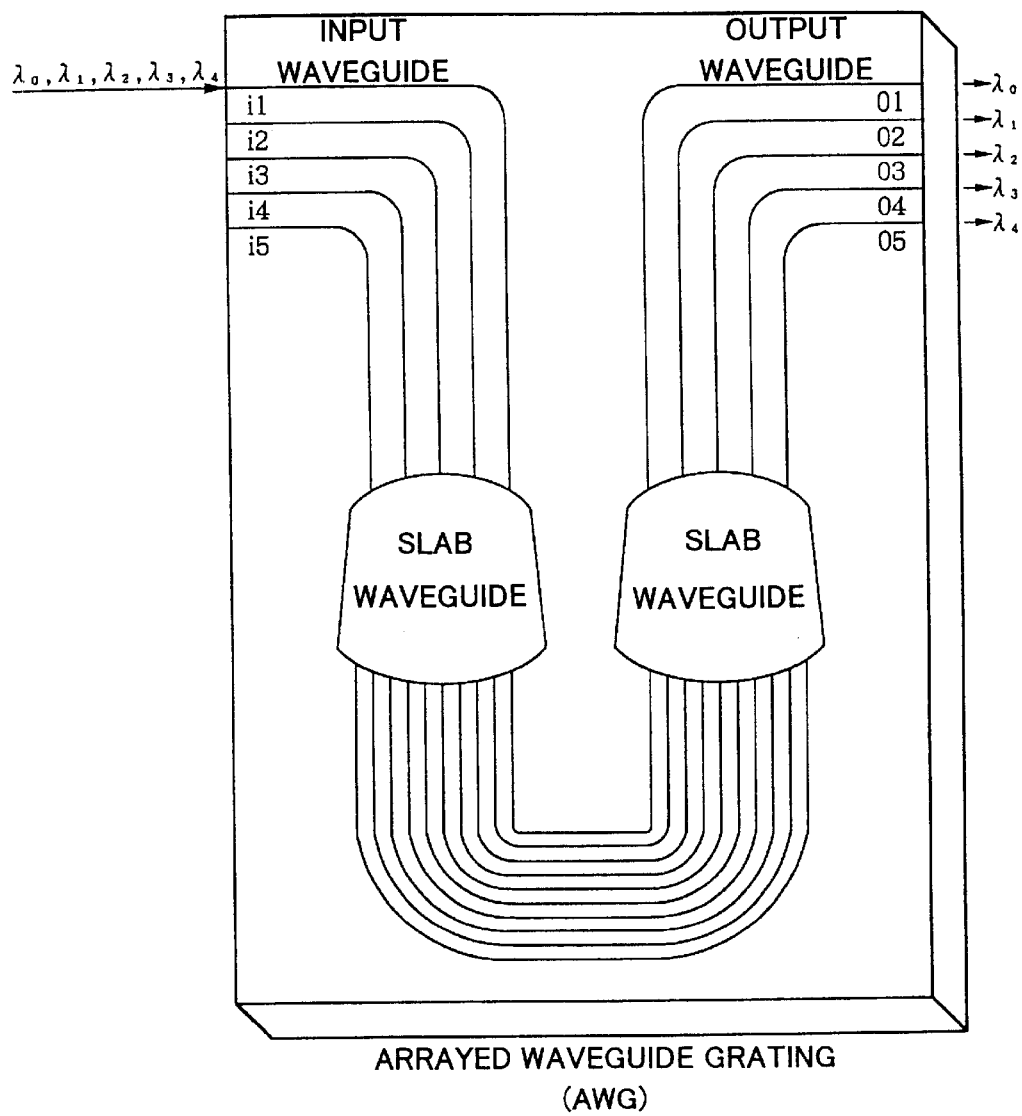
FIG. 31 is a conceptual diagram of an AWG.
Figure 33:
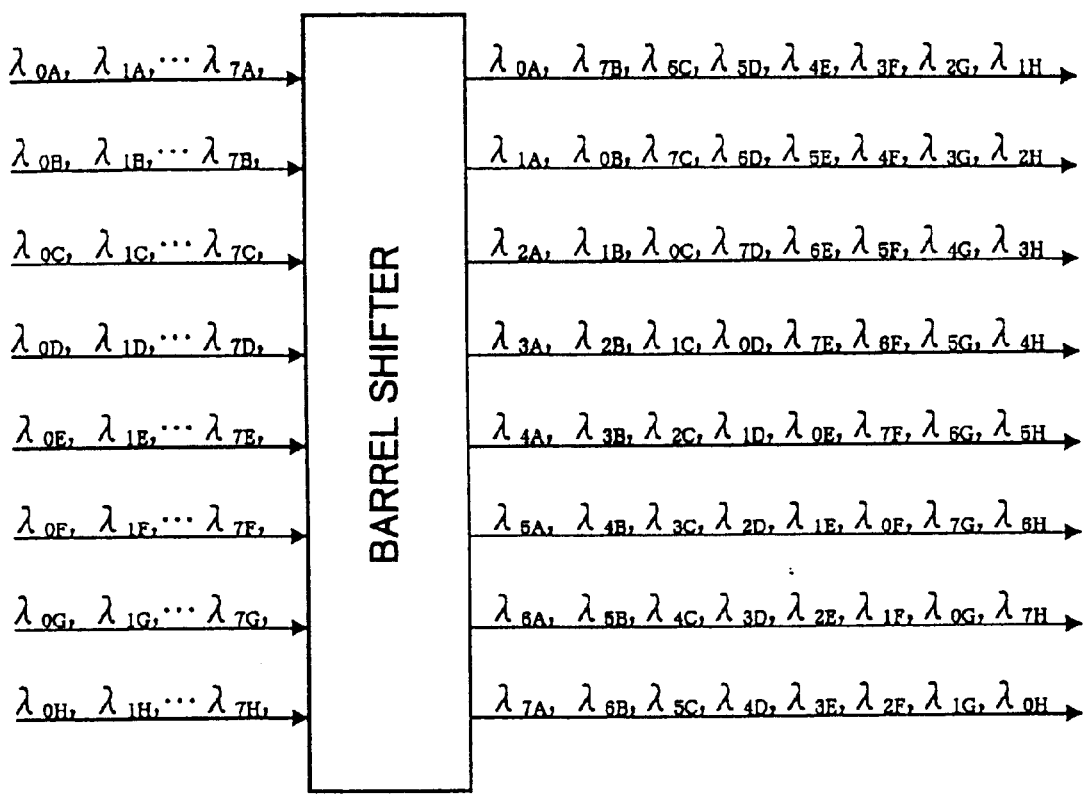
FIG. 33 is a diagram showing an 8-input by 8-output barrel shifter.

A tenth embodiment of the present invention will be described with reference to FIG. 26 and FIG. 27 in the following. Each of FIG. 26 and FIG. 27 is a block diagram of receiver ports which are realized by CMOS LSI circuits. As shown in FIG. 26, according to the tenth embodiment, the receiver port uses a shared buffer instead of a cell switch 26 shown in FIG. 2 and includes a traffic monitor 46 within the receiver port. Cell-identifying parts 51, the shared buffer 50 and the traffic monitor 46 can be realized by a CMOS LSI circuit. The cell-identifying part 51 has not been shown in the figures so far for the sake of simplicity, but it is necessary to provide it next to the O/E converter 22. Unlike the receiver port shown in FIG. 25 in which the cell switch 26 outputs 8 electronic-signal cells to an input port successively, according to the configuration as shown in FIG. 26, the shared buffer 50 temporarily stores the electronic-signal cells and the cells are successively read out from the shared buffer 50. The circuit size can be reduced by using such a shared buffer.

Further, a receiver port, as shown in FIG. 27, may have the shared buffer 50 instead of the cell buffers 24 and the arbiter 25 of the receiver port shown in FIG. 5. In this case, the cell-identifying parts 51, the address filters 23 and the shared buffer 50 can also be realized by a CMOS LSI circuit. of ATM connections at the line unit. According to the eighth embodiment of the present invention, the line unit provided at the input port (of the first stage of a multistage ATM switch as shown in FIG. 22) monitors traffic of routes connected to the input port, and, if the line unit detects a congested route, the line unit replaces headers of incoming cells so as to route the cells through another route. More specifically, the line unit reads out information on the congestion, and rewrites an inside-header adding table according to the information so that a header representing the congested route should not be added to the incoming cells, and, then, the line unit can establish a route alternative to the congested route.

As shown in (a) of FIG. 23, the RM cells are sent out from the line unit at established intervals to each route, and, as shown in (b), for example, if the line unit detects that a route B is congested, it rewrites the inside-header adding table so as to avoid the congested route as shown in (c).

Ninth Embodiment

Figure 24:
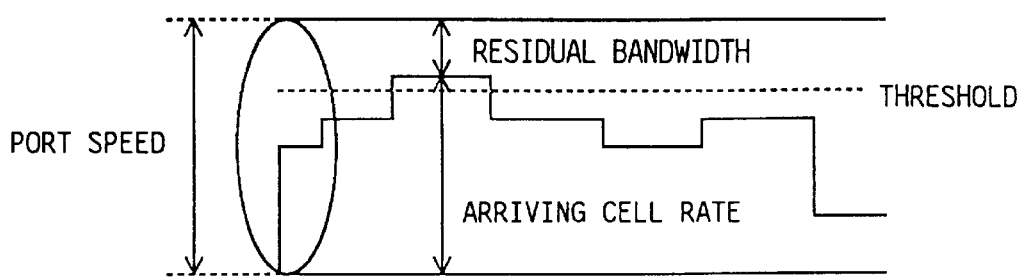
FIG. 24 is a diagram for explaining a relationship between a residual bandwidth and a threshold.

A ninth embodiment of the present invention will be described with reference to FIG. 24 and FIG. 25 in the following. FIG. 24 is a diagram for explaining a relationship between a residual bandwidth and a threshold and FIG. 25 is a block diagram showing the case in which the traffic monitors are provided at input ports. As shown in FIG. 24, in the ninth embodiment, a threshold of a residual bandwidth of a port is established. If the residual bandwidth is lower than the threshold, the line unit decides that traffic congestion occurs, and, then, the line unit sends the RM cell with the congestion information so as to avoid establishing an ATM connection on the congested route.

As mentioned above, in the ATM switch according to the embodiments of the present invention, it is possible to increase routes of cells by converting a cell being output from each output port of each basic switch #1ki at the front stage into a wavelength-multiplexed signal including the same number of wavelengths as the number of basic switches of one group at the back stage. Therefore, the number of basic switches which can be connected can be increased. For example, in the case of using an M-wavelength-multiplexing technology, the size of the ATM switch is expanded to M times when compared to a conventional ATM switch. More precisely, in a conventional technology in which M×M basic switches and M-wavelength-multiplexing links are used, the number of ports can be expanded to $M^2$ at most. However, according to the present invention, it can be expanded to $M^3$.

Because the ATM switch having $MN^2$ inputs by $MN^2$ outputs can be realized by using N×N basic switches, in other words, because there is no need to change the number of ports of the basic switches, a large-scale ATM switch can be realized easily and at a low cost. Further, by decreasing the cell-transmission rate using the speed-conversion buffer 40, by converting incoming cells at unbalanced intervals into cells at balanced intervals using the traffic monitor 46, by distributing the cells equally to a plurality of routes using the connection-route-managing part 47, and by establishing routes according to ATM service classes, and so on, the hardware configuration can be more simple and can be realized at a lower cost.

Further, as mentioned above, according to the present invention, the scale of an ATM switch can be expanded without increasing the number of ports of the basic switch and the number of the wavelengths. In addition, the hardware, especially, the part situated at the back of the sender port, can be realized at a low cost. Further, the size of buffers can be reduced, and a plurality of ATM connections of different ATM service classes are efficiently accommodated into the ATM switch. Furthermore, congestion in the ATM connections can be reduced.

The present invention is not limited to the specifically disclosed embodiments, and variations and modifications may be made without departing from the scope of the invention.

What is claimed is:

1. An ATM switch including S stages (S is an integer and 2<=S), wherein said each stage includes a plurality of basic switches, said ATM switch comprising:

M×N (each of M and N is an integer) basic switches per said each stage; and interconnecting means for interconnecting between said stages, wherein said M×N basic switches have N groups, and said interconnecting means connects a jth (j is an integer and 1<=j<=N) output port of said each basic switch belonging to an ith (i is an integer and 1<=i<=N) group at an (s−1)th (s is an integer and 2<=s<=S) stage to at least one ith input port of said basic switches belonging to a jth group at an sth stage.

2. The ATM switch as claimed in claim 1, wherein said interconnecting means includes means, which is provided at said each input port, for passing cells that are destined for a desired destination selectively among other cells.

3. The ATM switch as claimed in claim 1, wherein said interconnecting means includes means, which is provided at said each output port, for passing cells that are destined for a desired destination selectively among other cells.

4. The ATM switch as claimed in claim 1, wherein said interconnecting means comprises:

means for converting an electronic-signal cell which is output from said output port into a first wavelength-multiplexed optical signal which includes a plurality of optical signals which have different wavelengths and for outputting the first wavelength-multiplexed optical signal;

means for generating a second wavelength-multiplexed optical signal by switching optical signals and outputting the second wavelength-multiplexed optical signal; and means for converting said second wavelength-multiplexed optical signal into electronic-signal cells and inputting at least one said electronic-signal cells to the input port.

5. The ATM switch as claimed in claim 1, wherein said interconnecting means comprises:

means for converting a first electronic-signal cell which is output from said output port into N optical-signal cells which have different wavelengths;

wavelength-multiplexing means for generating a wavelength-multiplexed optical signal by wavelength-multiplexing said N optical-signal cells;

wavelength-demultiplexing means for wavelength-demultiplexing a wavelength-multiplexed optical signal into N optical-signal cells which have different wavelengths;

means for converting said N optical-signal cells into N second electronic-signal cells;

input means for inputting at least one of said second electronic-signal cells to said input port; and wavelength-switching means for switching optical signals of M said wavelength-multiplexed optical signals arriving from said wavelength-multiplexing means and for outputting the switched wavelength-multiplexed optical signals to said wavelength-demultiplexing means, wherein said wavelength-switching means is provided between said wavelength-multiplexing means which is connected to jth output ports of said basic switches belonging to said ith group at said (s−1)th stage and said wavelength-demultiplexing means which is connected to ith input ports of said basic switches belonging to said jth group at said sth stage.

6. The ATM switch as claimed in claim 5, wherein said input means comprises means for passing only electronic-signal cells that are destined for a desired destination selectively among said electronic-signal cells.

7. The ATM switch as claimed in claim 5, wherein said ATM switch further comprises means for converting said each electronic-signal cell output from said output port into an optical-signal cell which has a wavelength corresponding to the destination of the electronic-signal cell.

8. The ATM switch as claimed in claim 5, wherein said wavelength-switching means includes a barrel shifter which outputs an optical signal of a pth (p=1,2, ... ,N) wavelength in the mth (m=1,2, ... ,M) wavelength-multiplexed optical signal into an (m+p)th output of the barrel shifter, wherein if m+p is k (k is an integer) more than the number of said wavelength-demultiplexing means, the barrel shifter outputs the optical signal into an ((m+p)−k)th output of the barrel shifter.

9. The ATM switch as claimed in claim 1, wherein the ATM switch further comprises speed-conversion means for converting the speed of electronic-signal cells output from said output port.

10. The ATM switch as claimed in claim 9, wherein said speed-conversion means comprises:
   at least a cell buffer; and
   means for controlling the ratio between the writing-clock speed of the cell buffer and the reading-clock speed of the cell buffer.

11. The ATM switch as claimed in claim 9, wherein said speed-conversion means comprises:
   at least a cell buffer; and
   means for controlling the ratio between the number of bit expansion data at the input side of the cell buffer and the number of bit expansion data at the output side of the cell buffer.

12. The ATM switch as claimed in claim 1, wherein the ATM switch further comprises:
   means for monitoring the arriving rate of said electronic-signal cells output from said output port; and
   means for converting the speed of the electronic-signal cells according to the arriving rate.

13. The ATM switch as claimed in claim 1, wherein the ATM switch further comprises:
   at least a cell buffer which temporarily stores said electronic-signal cells output from said output port;
   means for monitoring the rate of said electronic-signal cells arriving at said cell buffer; and
   means for establishing a plurality of ATM connections between said basic switches so as to equalize the cell-transmission rates of the ATM connections by using the arriving rate.

14. The ATM switch as claimed in claim 9, wherein the ATM switch further comprises means for establishing routes of ATM connections having a plurality of service classes.

15. The ATM switch as claimed in claim 1, wherein the ATM switch further comprises:
   monitoring means for monitoring the arriving rate of said electronic-signal cells;
   detecting means for detecting traffic congestion of a route between said basic switches by using the arriving rate; and
   means for prohibiting the ATM switch from establishing an ATM connection on the route in which said traffic congestion is detected.

16. The ATM switch as claimed in claim 15, wherein said monitoring means and detecting means are provided at the input port of said basic switch.

17. The ATM switch as claimed in claim 15, wherein said detecting means includes means for transmitting the result of the detection to at least one basic switch.

18. The ATM switch as claimed in claim 1, wherein the ATM switch further comprises:
   monitoring means for monitoring the residual bandwidth of a port of said basic switch;
   means for sending an RM (Resource Management) cell to a plurality of routes;
   sending-back means for receiving and sending back the RM cell; and
   prohibiting means for prohibiting the ATM switch from establishing an ATM connection on a specific route according to the RM cell which is sent back,
   wherein, if said monitoring means detects that the residual bandwidth is less than a predetermined value, said sending-back means includes information of traffic congestion into the RM cell and sends back the RM cell, and said prohibiting means prohibits the ATM switch from establishing an ATM connection on a route indicated by the content of the RM cell which is sent back.

19. The ATM switch as claimed in claim 18, wherein said prohibiting means includes means for adding a header for avoiding a congested route to a cell according to the content of the RM cell.

20. A device in an ATM switch in which a plurality of stages are interconnected, wherein each of said stages has a plurality of basic switches and said device converts an electronic-signal cell output from an output port of a basic switch in said basic switches into a wavelength-multiplexed optical signal, said device comprising:
   means for dividing said electronic-signal cell into a plurality of electronic-signal cells;
   converting means for converting said electronic-signal cells into optical-signal cells of different wavelengths; and
   means for wavelength-multiplexing said optical-signal cells,
   wherein, at the destination of said each optical-signal cell, said each optical-signal cell is converted into an electronic-signal cell and the electronic-signal cell is input into an input port by being selected among electronic-signal cells.

21. The device as claimed in claim 20, wherein said device includes means for inputting said electronic-signal cell into said converting means after converting the speed of said electronic-signal cell.

22. A device in an ATM switch in which a plurality of stages are interconnected, wherein the stage has a plurality of basic switches, and said device converts a wavelength-multiplexed optical signal in which a plurality of electronic-signal cells of different destinations are wavelength-multiplexed into electronic-signal cells and inputs one of the electronic-signal cells into an input port of said basic switch, said device comprising:
   means for generating a plurality of optical-signal cells by wavelength-demultiplexing said wavelength-multiplexed optical signal;
   means for converting said optical-signal cells into said electronic-signal cells; and
   means for selecting an electronic-signal cell destined for the input port among said electronic-signal cells and inputting the selected electronic-signal cell to the input port.

* * * * *

UNITED STATES PATENT AND TRADEMARK OFFICE
CERTIFICATE OF CORRECTION

PATENT NO. : 6,570,874 B1
DATED : May 27, 2003
INVENTOR(S) : Kohei Nakai et al.

It is certified that error appears in the above-identified patent and that said Letters Patent is hereby corrected as shown below:

Column 12,
Line 13, please insert

"of ATM connections at the line unit. According to the eighth embodiment of the present invention, the line unit provided at the input port (of the first stage of a multistage ATM switch as shown in FIG. 22) monitors traffic of routes connected to the input port, and, if the line unit detects a congested route, the line unit replaces headers of incoming cells so as to route the cells through another route. More specifically, the line unit reads out information on the congestion, and rewrites an inside-header adding table according to the information so that a header representing the congested route should not be added to the incoming cells, and, then, the line unit can establish a route alternative to the congested route.

As shown in (a) of FIG. 23, the RM cells are sent out from the line unit at established intervals to each route, and, as shown in (b), for example, if the line unit detects that a route B is congested, it rewrites the inside-header adding table so as to avoid the congested route as shown in (c)."

Line 14, please delete

"Further, as shown in FIG. 25, the traffic monitor may be provided at an input port side of the back stage. In this case, a congested condition of a route also can be detected as in the case of providing the traffic monitor at an output port side as shown in FIG. 17.

Tenth Embodiment

A tenth embodiment of the present invention will be described with reference to FIG. 26 and FIG. 27 in the following. Each of FIG. 26 and FIG. 27 is a block diagram of receiver ports which are realized by CMOS LSI circuits. As shown in FIG. 26, according to the tenth embodiment, the receiver port uses a shared buffer instead of a cell switch 26 shown in FIG. 2 and includes a traffic monitor 46 within the receiver port. Cell-identifying parts 51, the shared buffer 50 and the traffic monitor 46 can be realized by a CMOS LSI circuit. The cell-identifying part 51 has not been shown in the figures so far for the sake of simplicity, but it is necessary to provide it next to the O/E converter 22. Unlike the receiver port shown in Fig. 25 in which the cell switch 26 outputs 8 electronic-signal cells to an input port successively, according to the configuration as shown in FIG. 26, the shared buffer 50 temporarily stores the electronic-signal cells and the cells are successively read out from the shared buffer 50. The circuit size can be reduced by using such a shared buffer.

UNITED STATES PATENT AND TRADEMARK OFFICE
CERTIFICATE OF CORRECTION

PATENT NO. : 6,570,874 B1
DATED : May 27, 2003
INVENTOR(S) : Kohei Nakai et al.

It is certified that error appears in the above-identified patent and that said Letters Patent is hereby corrected as shown below:

Column 12 (cont'd),

Further, a receiver port, as shown in FIG. 27, may have the shared buffer 50 instead of the cell buffers 24 and the arbiter 25 of the receiver port shown in FIG. 5. In this case, the cell-identifying parts 51, the address filters 23 and the shared buffer 50 can also be realized by a CMOS LSI circuit."

Line 45, please delete

"of ATM connections at the line unit. According to the eighth embodiment of the present invention, the line unit provided at the input port (of the first stage of a multistage ATM switch as shown in FIG. 22) monitors traffic of routes connected to the input port, and, if the line unit detects a congested route, the line unit replaces headers of incoming cells so as to route the cells through another route. More specifically, the line unit reads out information on the congestion, and rewrites an inside-header adding table according to the information so that a header representing the congested route should not be added to the incoming cells, and, then, the line unit can establish a route alternative to the congested route.

As shown in (a) of FIG. 23, the RM cells are sent out from the line unit at established intervals to each route, and, as shown in (b), for example, if the line unit detects that a route B is congested, it rewrites the inside-header adding table so as to avoid the congested route as shown in (c)."

Column 13,
After line 10, please insert

"Further, as shown in FIG. 25, the traffic monitor may be provided at an input port side of the back stage. In this case, a congested condition of a route also can be detected as in the case of providing the traffic monitor at an output port side as shown in FIG. 17.

UNITED STATES PATENT AND TRADEMARK OFFICE
CERTIFICATE OF CORRECTION

PATENT NO. : 6,570,874 B1
DATED : May 27, 2003
INVENTOR(S) : Kohei Nakai et al.

It is certified that error appears in the above-identified patent and that said Letters Patent is hereby corrected as shown below:

Column 13 (cont'd),

Tenth Embodiment

A tenth embodiment of the present invention will be described with reference to FIG. 26 and FIG. 27 in the following. Each of FIG. 26 and FIG. 27 is a block diagram of receiver ports which are realized by CMOS LSI circuits. As shown in FIG. 26, according to the tenth embodiment, the receiver port uses a shared buffer instead of a cell switch 26 shown in FIG. 2 and includes a traffic monitor 46 within the receiver port. Cell-identifying parts 51, the shared buffer 50 and the traffic monitor 46 can be realized by a CMOS LSI circuit. The cell-identifying part 51 has not been shown in the figures so far for the sake of simplicity, but it is necessary to provide it next to the O/E converter 22. Unlike the receiver port shown in Fig. 25 in which the cell switch 26 outputs 8 electronic-signal cells to an input port successively, according to the configuration as shown in FIG. 26, the shared buffer 50 temporarily stores the electronic-signal cells and the cells are successively read out from the shared buffer 50. The circuit size can be reduced by using such a shared buffer.

Further, a receiver port, as shown in FIG. 27, may have the shared buffer 50 instead of the cell buffers 24 and the arbiter 25 of the receiver port shown in FIG. 5. In this case, the cell-identifying parts 51, the address filters 23 and the shared buffer 50 can also be realized by a CMOS LSI circuit."

Signed and Sealed this

Ninth Day of August, 2005

JON W. DUDAS
*Director of the United States Patent and Trademark Office*